United States Patent
Simon et al.

(10) Patent No.: US 10,158,518 B2
(45) Date of Patent: Dec. 18, 2018

(54) SYSTEM DISCOVERY AND SIGNALING

(71) Applicant: One Media LLC, Hunt Valley, MD (US)

(72) Inventors: Michael J. Simon, Frederick, MD (US); Kevin A. Shelby, Austin, TX (US); Mark Earnshaw, Kanata (CA); Sandeep Mavuduru Kannappa, San Diego, CA (US)

(73) Assignee: One Media LLC, Hunt Valley, MD (US)

( * ) Notice: Subject to any disclaimer, the term of this patent is extended or adjusted under 35 U.S.C. 154(b) by 0 days.

(21) Appl. No.: 15/648,978

(22) Filed: Jul. 13, 2017

(65) Prior Publication Data

US 2017/0310523 A1   Oct. 26, 2017

Related U.S. Application Data

(63) Continuation of application No. 15/065,427, filed on Mar. 9, 2016.
(Continued)

(51) Int. Cl.
*H04L 27/26* (2006.01)
*H04J 13/00* (2011.01)
*H04J 13/10* (2011.01)

(52) U.S. Cl.
CPC ...... *H04L 27/2663* (2013.01); *H04J 13/0022* (2013.01); *H04J 13/0059* (2013.01);
(Continued)

(58) Field of Classification Search
CPC ............ H04L 1/0083; H04L 27/2601; H04L 27/2656; H04L 27/2675; H04L 1/1692; H04W 48/10; H04W 4/00; H04W 72/0406
(Continued)

(56) References Cited

U.S. PATENT DOCUMENTS 6,052,411 A    4/2000 Mueller et al.
6,289,000 B1   9/2001 Yonge, III
(Continued)

FOREIGN PATENT DOCUMENTS

CN    101601221 A    12/2009
CN    105007145 A    10/2015
(Continued)

OTHER PUBLICATIONS

A/321 Part 1:ATSC Candidate Standard: Sytem Discovery and Signalling. May 6, 2015.*
(Continued)

*Primary Examiner* — Kevin M Burd
(74) *Attorney, Agent, or Firm* — Sterne, Kessler, Goldstein & Fox, PLLC

(57) ABSTRACT

An extensible communication system is described herein. The system includes a first module for receiving a root index value and for generating a constant amplitude zero auto-correlation sequence based on the root value. The system further includes a second module for receiving a seed value and for generating a Pseudo-Noise sequence based on the seed value. The system further includes a third module for modulating the constant amplitude zero auto-correlation sequence by the Pseudo-Noise sequence and for generating a complex sequence. The system further includes a fourth module for translating the complex sequence to a time domain sequence, wherein the fourth module applies a cyclic shift to the time domain sequence to obtain a shifted time domain sequence.

28 Claims, 13 Drawing Sheets

Related U.S. Application Data

(60) Provisional application No. 62/130,365, filed on Mar. 9, 2015.

(52) U.S. Cl.
CPC ........ *H04J 13/107* (2013.01); *H04L 27/2613* (2013.01); *H04L 27/2692* (2013.01)

(58) Field of Classification Search
USPC ........................................................ 375/130
See application file for complete search history.

(56) References Cited

U.S. PATENT DOCUMENTS

| | | |
|---|---|---|
| 6,961,388 B2 | 11/2005 | Ling et al. |
| 7,778,151 B2 | 8/2010 | Bertrand et al. |
| 7,920,884 B2 | 4/2011 | Agrawal et al. |
| 8,577,299 B2 | 11/2013 | Agrawal et al. |
| 8,619,540 B2 | 12/2013 | Li et al. |
| 8,804,675 B2 | 8/2014 | Gutierrez et al. |
| 9,036,567 B2 | 5/2015 | Krishnmoorthi et al. |
| 9,043,687 B2 | 5/2015 | Ko et al. |
| 9,179,440 B2 | 11/2015 | Gutierrez et al. |
| 9,253,428 B2 | 2/2016 | Allison, III et al. |
| 9,258,800 B2 | 2/2016 | Kwak et al. |
| 9,300,327 B2 | 3/2016 | Ko et al. |
| 9,307,273 B2 | 4/2016 | Yoo et al. |
| 9,363,040 B2 | 6/2016 | Ko et al. |
| 9,369,325 B2 | 6/2016 | Kim et al. |
| 9,386,562 B2 | 7/2016 | Gutierrez et al. |
| 9,762,347 B2 | 9/2017 | Shelby et al. |
| 2006/0221810 A1* | 10/2006 | Vrcelj ................. H04L 27/2656 370/208 |
| 2008/0051125 A1 | 2/2008 | Muharemovic et al. |
| 2008/0075184 A1 | 3/2008 | Muharemovic et al. |
| 2008/0095254 A1 | 4/2008 | Muharemovic |
| 2008/0101507 A1 | 5/2008 | Oketani et al. |
| 2008/0273582 A1 | 11/2008 | Gaal et al. |
| 2009/0073944 A1 | 3/2009 | Jiang et al. |
| 2009/0245222 A1* | 10/2009 | Sampath ............. H04L 27/2607 370/343 |
| 2009/0325513 A1 | 12/2009 | Iwai et al. |
| 2010/0067461 A1 | 3/2010 | Kwak et al. |
| 2010/0091904 A1 | 4/2010 | Wang et al. |
| 2010/0111224 A1* | 5/2010 | Lim ...................... H04L 1/0028 375/296 |
| 2010/0220664 A1 | 9/2010 | Hooli et al. |
| 2010/0290557 A1 | 11/2010 | Lee et al. |
| 2010/0309861 A1 | 12/2010 | Gorokhov et al. |
| 2011/0013718 A1* | 1/2011 | Ko ........................ H04L 1/0045 375/295 |
| 2011/0019622 A1 | 1/2011 | Lee et al. |
| 2011/0044401 A1 | 2/2011 | Ko et al. |
| 2011/0105135 A1 | 5/2011 | Krishnamurthy et al. |
| 2011/0182328 A1 | 7/2011 | Imamura et al. |
| 2012/0008577 A1 | 1/2012 | Han et al. |
| 2012/0033647 A1 | 2/2012 | Moon et al. |
| 2012/0163348 A1 | 6/2012 | Han et al. |
| 2012/0294273 A1 | 11/2012 | Ahn et al. |
| 2013/0018934 A1 | 1/2013 | Kim et al. |
| 2013/0208679 A1 | 8/2013 | Joung et al. |
| 2013/0223389 A1 | 8/2013 | Papasakellariou et al. |
| 2013/0286996 A1 | 10/2013 | Takeda et al. |
| 2014/0112274 A1 | 4/2014 | Moon et al. |
| 2014/0269982 A1 | 9/2014 | Asjadi |
| 2014/0321397 A1 | 10/2014 | Shen et al. |
| 2014/0323126 A1 | 10/2014 | Ro et al. |
| 2014/0362804 A1 | 12/2014 | Han et al. |
| 2015/0006586 A1 | 1/2015 | Mourad et al. |
| 2015/0043491 A1 | 2/2015 | Eng et al. |
| 2015/0049642 A1 | 2/2015 | Eng et al. |
| 2015/0055727 A1 | 2/2015 | Kim et al. |
| 2015/0181281 A1 | 6/2015 | Ko et al. |
| 2015/0195067 A1 | 7/2015 | Kim et al. |
| 2015/0236884 A1 | 8/2015 | Suh et al. |
| 2015/0304070 A1 | 10/2015 | Baek et al. |
| 2015/0358106 A1 | 12/2015 | Limberg et al. |
| 2016/0020884 A1 | 1/2016 | Chae et al. |
| 2016/0056910 A1 | 2/2016 | Shelby et al. |
| 2016/0057504 A1 | 2/2016 | Shelby et al. |
| 2016/0065343 A1 | 3/2016 | Kim et al. |
| 2016/0094895 A1 | 3/2016 | Stadelmeier et al. |
| 2016/0094970 A1 | 3/2016 | Oh et al. |
| 2016/0105223 A1 | 4/2016 | Baek et al. |
| 2016/0119908 A1 | 4/2016 | Kwak et al. |
| 2016/0164541 A1 | 6/2016 | Ko et al. |
| 2016/0164637 A1 | 6/2016 | Suh et al. |
| 2016/0165273 A1 | 6/2016 | Moon et al. |
| 2016/0165274 A1 | 6/2016 | Moon et al. |
| 2016/0173312 A1 | 6/2016 | Moon et al. |
| 2016/0191288 A1 | 6/2016 | Baek et al. |
| 2016/0198217 A1 | 7/2016 | Ko et al. |
| 2016/0241358 A1 | 8/2016 | Ko et al. |
| 2016/0241365 A1 | 8/2016 | Bae et al. |
| 2016/0269980 A1 | 9/2016 | Simon et al. |
| 2017/0207873 A1 | 7/2017 | Shelby et al. |
| 2017/0207945 A1 | 7/2017 | Shelby et al. |

FOREIGN PATENT DOCUMENTS

| | | |
|---|---|---|
| CN | 105007146 A | 10/2015 |
| CN | 105024791 A | 11/2015 |
| CN | 105024952 A | 11/2015 |
| CN | 105024963 A | 11/2015 |
| CN | 105245479 A | 1/2016 |
| CN | 105282076 A | 1/2016 |
| CN | 105282078 A | 1/2016 |
| CN | 105323048 A | 2/2016 |
| CN | 105743624 A | 7/2016 |
| CN | 105991266 A | 10/2016 |
| CN | 105991495 A | 10/2016 |
| CN | 105991498 A | 10/2016 |
| CN | 105991500 A | 10/2016 |
| CN | 105991501 A | 10/2016 |
| CN | 105991502 A | 10/2016 |
| EP | 2 153 606 B1 | 2/2012 |
| JP | 2010-536297 | 11/2010 |
| JP | 2012-114835 | 6/2012 |
| JP | 2013-541898 | 11/2013 |
| WO | WO 2014/082679 A1 | 6/2014 |

OTHER PUBLICATIONS

English translation for Chinese patent publication No. CN 105007145 A, published Oct. 28, 2015, 17 pages, translated by Google at https://patents.google.com.

English translation for Chinese patent publication No. CN 105007146 A, published Oct. 28, 2015, 17 pages, translated by Google at https://patents.google.com.

English translation for Chinese patent publication No. CN 105024791 A, published Nov. 4, 2015, 14 pages, translated by Google at https://patents.google.com.

English translation for Chinese patent publication No. CN 105024952 A, published Nov. 4, 2015, 20 pages, translated by Google at https://patents.google.com.

English translation for Chinese patent publication No. CN 105024963 A, published Nov. 4, 2015, 23 pages, translated by Google at https://patents.google.com.

English translation for Chinese patent publication No. CN 105245479 A, published Jan. 13, 2016, 28 pages, translated by Google at https://patents.google.com.

English translation for Chinese patent publication No. CN 105282076 A, published Jan. 27, 2016, 21 pages, translated by Google at https://patents.google.com.

English translation for Chinese patent publication No. CN 105282078 A, published Jan. 27, 2016, 24 pages, translated by Google at https://patents.google.com.

English translation for Chinese patent publication No. CN 105323048 A, published Feb. 10, 2016, 26 pages, translated by Google at https://patents.google.com.

(56) References Cited

OTHER PUBLICATIONS

English translation for Chinese patent publication No. CN 105743624 A, published Jul. 6, 2016, 38 pages, translated by Google at https://patents.google.com.
English translation for Chinese patent publication No. CN 105991266 A, published Oct. 5, 2016, 29 pages, translated by Google at https://patents.google.com.
English translation for Chinese patent publication No. CN 105991495 A, published Oct. 5, 2016, 21 pages, translated by Google at https://patents.google.com.
English translation for Chinese patent publication No. CN 105991498 A, published Oct. 5, 2016, 56 pages, translated by Google at https://patents.google.com.
English translation for Chinese patent publication No. CN 105991500 A, published Oct. 5, 2016, 40 pages, translated by Google at https://patents.google.com.
English translation for Chinese patent publication No. CN 105991501 A, published Oct. 5, 2016, 44 pages, translated by Google at https://patents.google.com.
English translation for Chinese patent publication No. CN 105991502 A, published Oct. 5, 2016, 25 pages, translated by Google at https://patents.google.com.
International Search Report and Written Opinion for PCT Application No. PCT/US16/21547, filed Mar. 9, 2016, 6 pages, dated May 27, 2016.
A/321 Part 1: ATSC Candidate Standard: System Discovery and Signaling, pp. i-iv and 1-16, May 6, 2015.
Ericsson, "Scheduling Request in E-UTRAN," 3GPP TSG-RAN WG2 #47bis, R1-070471, Agenda Item 6.9.1, Sorrento, Italy, pp. 1-11, Jan. 15-19, 2007.
LG Electronics, "S-SCH sequence design," 3GPP TSG RAN WG1 #47bis, R1-070231, Agenda Item 6.5.2, Sorrento, Italy, pp. 1-10, Jan. 15-19, 2007.
Lge et al., "Correction of PUCCH index generation formula," 3GPP TSG-RAN Meeting #54, R1-082915, Current Version 8.3.0, Jeju, Island, South Korea, 2 pages, Aug. 18-22, 2008.
Silva C., Eric M. et al., "Synchronization Algorithms based on Weighted CAZAC Preambles for OFDM Systems," 2013 13th International Symposium on Communications and Information Technologies (ISCIT), Sep. 4, 2013, pp. 192-197.
Wang, Han et al., A Novel Synchronization Algorithm for OFDM Systems with Weighted CAZAC Sequence, Journal of Computational Information Systems, Binary Information Press, 2012, vol. 8, pp. 2275-2283, http://www.jofcis.com/publishedpapers/2012_8_6_2_2275_2283.pdf.
English Translation of First Official Action, dated Mar. 27, 2018, for Chinese Patent Application 201580045920.8, 9 pages.
Search Report, dated Mar. 16, 2018, for Chinese Patent Application 201580045920.8, 2 pages.
English Translation of Notice of Reasons for Rejection, dated Oct. 24, 2017, for Japanese Patent Application No. 2017-508042, 6 pages.
English Translation of Notice of Reasons for Rejection, dated May 10, 2018, for Japanese Patent Application No. 2017-508042, 3 pages.
Supplementary European Search Report, dated Mar. 20, 2018, for European Patent Application No. 15836979.3, 11 pages.
International Search Report and Written Opinion; International Application No. PCT/US2015/046719, 15 pages, dated Nov. 19, 2015.
English Translation of Chinese Patent Publication No. CN 101601221 A, published Dec. 9, 2009, 14 pages, translated by Google at https://patents.google.com.
English Translation for Japanese Patent Publication No. JP 2010-536297 A, published Nov. 25, 2010, 9 pages, translated by Google at https://patents.google.com/patent/JP2010536297A/en.
English Translation for Japanese Patent Publication No. JP 2012-114835 A, published Jun. 14, 2012, 12 pages, translated by Google at https://patents.google.com/patent/JP2012114835A/en.
English Translation for Japanese Patent Publication No. JP 2013-541898 A, published Nov. 14, 2013, 8 pages, translated by Google at https://patents.google.com/patent/JP2013541898A/en.

* cited by examiner

SYSTEM DISCOVERY AND SIGNALING

CROSS-REFERENCE TO RELATED APPLICATIONS

This application is a continuation of U.S. patent application Ser. No. 15/065,427 filed on Mar. 9, 2016, now pending, which claims priority from U.S. Provisional Patent Application No. 62/130,365 filed on Mar. 9, 2015, both of which are incorporated by reference herein in their entirety.

FIELD OF DISCLOSURE

The present disclosure relates to the field of wireless communication, and more particularly, to a mechanism for enabling robust signal detection and service discovery in broadcast networks.

BACKGROUND

The broadcast spectrum is divided up into different frequencies and allocated among different broadcasters for various uses in different geographic regions. The frequencies of the spectrum are allocated based on licenses granted to the broadcasters. Based on the allocations, a broadcaster may be limited to broadcasting a specific type of content, such a television signal, on a certain frequency within a certain geographic radius. Broadcasting outside of an allocated spectrum could be a violation for the broadcaster.

If a broadcaster wishes to transmit another type of content within that geographic radius, the broadcaster may be required to obtain an additional spectrum license and in turn be allocated an additional frequency within that frequency. Similarly, if a broadcaster wishes to transmit content within another geographic radius, the broadcaster may be required to obtain an additional spectrum license for that region. Obtaining additional spectrum licenses, however, may be difficult, time consuming, expensive, and impractical.

In addition, a broadcaster may not always fully utilize an entire portion of spectrum for which it has been granted a license. This may create inefficiencies in the utilization of the broadcast spectrum.

Moreover, the anticipated use of the broadcast spectrum may be changing. For example, current broadcast television solutions are monolithic and designed for a primary singular service. However, broadcasters may anticipate providing multiple wireless-based types of content, in addition to broadcast television in the future, including mobile broadcasting and IoT services. In particular, there are many scenarios where a large number of devices may all wish to receive identical data from a common source beyond broadcast television. One such example is mobile communication services, where a large number of mobile communication devices in various geographic locations may all need to receive a common broadcast signal conveying the same content, such as a software update or an emergency alert, for example. In such scenarios, it is significantly more efficient to broadcast or multicast the data to such devices rather than individually signaling the same data to each device. Thus, a hybrid solution may be desirable.

To more efficiently utilize the broadcast spectrum, different types of content may be time-multiplexed together within a single RF channel. Further, different sets of transmitted content may need to be transmitted with different encoding and transmission parameters, either simultaneously, in a time division-multiplexed fashion (TDM), in a frequency division-multiplexed (FDM), layer division-multiplexed (LDM) or a combination. The amount of content to be transmitted may vary with time and/or frequency.

In addition, content with different quality levels (e.g. high definition video, standard definition video, etc.) may need to be transmitted to different groups of devices with different propagation channel characteristics and different receiving environments. In other scenarios, it may be desirable to transmit device-specific data to a particular device, and the parameters used to encode and transmit that data may depend upon the device's location and/or propagation channel conditions.

At the same time, the demand for high-speed wireless data continues to increase, and it is desirable to make the most efficient use possible of the available wireless resources (such as a certain portion of the wireless spectrum) on a potentially time-varying basis.

SUMMARY

An example extensible communication system is described herein. The system includes a first module for receiving a root index value and for generating a constant amplitude zero auto-correlation sequence based on the root value. The system further includes a second module for receiving a seed value and for generating a Pseudo-Noise sequence based on the seed value. The system further includes a third module for modulating the constant amplitude zero auto-correlation sequence by the Pseudo-Noise sequence and for generating a complex sequence. The system further includes a fourth module for translating the complex sequence to a time domain sequence, wherein the fourth module applies a cyclic shift to the time domain sequence to obtain a shifted time domain sequence.

An example extensible communication method is described herein. The method comprises the step of receiving a root index value and generating a constant amplitude zero auto-correlation sequence based on the root value. The method further comprises the step of receiving a seed value and generating a Pseudo-Noise sequence based on the seed value. The method further comprises the step of modulating the constant amplitude zero auto-correlation sequence by the Pseudo-Noise sequence and generating a complex sequence. The method further comprises the step of translating the complex sequence to a time domain sequence and applying a cyclic shift to the time domain sequence to obtain a shifted time domain sequence.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Described herein is a robust and extensible signaling framework, and, in particular, a bootstrap signal designed to enable robust detection and service discovery, system synchronization, and receiver configuration. The bootstrap provides two primary functions: synchronization and the signaling to discover the waveform being emitted via low level signaling to start decoding a waveform that follows. It is a robust waveform that provides extensibility to evolve over time. In particular, the bootstrap signal works for current broadcasting system but also allows for support of new services, including mobile broadcasting and IoT services.

A robust signaling system enables a signal to be discovered in high noise, low 'carrier to noise ratio' (CNR), and high Doppler environments. It should be appreciated that it is possible that only the bootstrap signal may be robust, while the actual waveform following bootstrap may not be as robust. Having a robust bootstrap signal allows synchronization by receivers to achieve and maintain a lock to the signal they are picking up in less than ideal environments. When noise conditions worsen and the receiver can no longer discern the payload from noise, it may still remain locked to the channel through the bootstrap. When noise conditions improve, the receiver does not need to go through the entire re-acquisition process since it already knows where to find the channel.

With an extensible signaling system, many different waveforms can be signaled, one for each of the types of services that is going to be transmitted in the future. Thus, new waveform is that don't exist today that may need to be used can also be signaled through the bootstrap.

Figure 1:
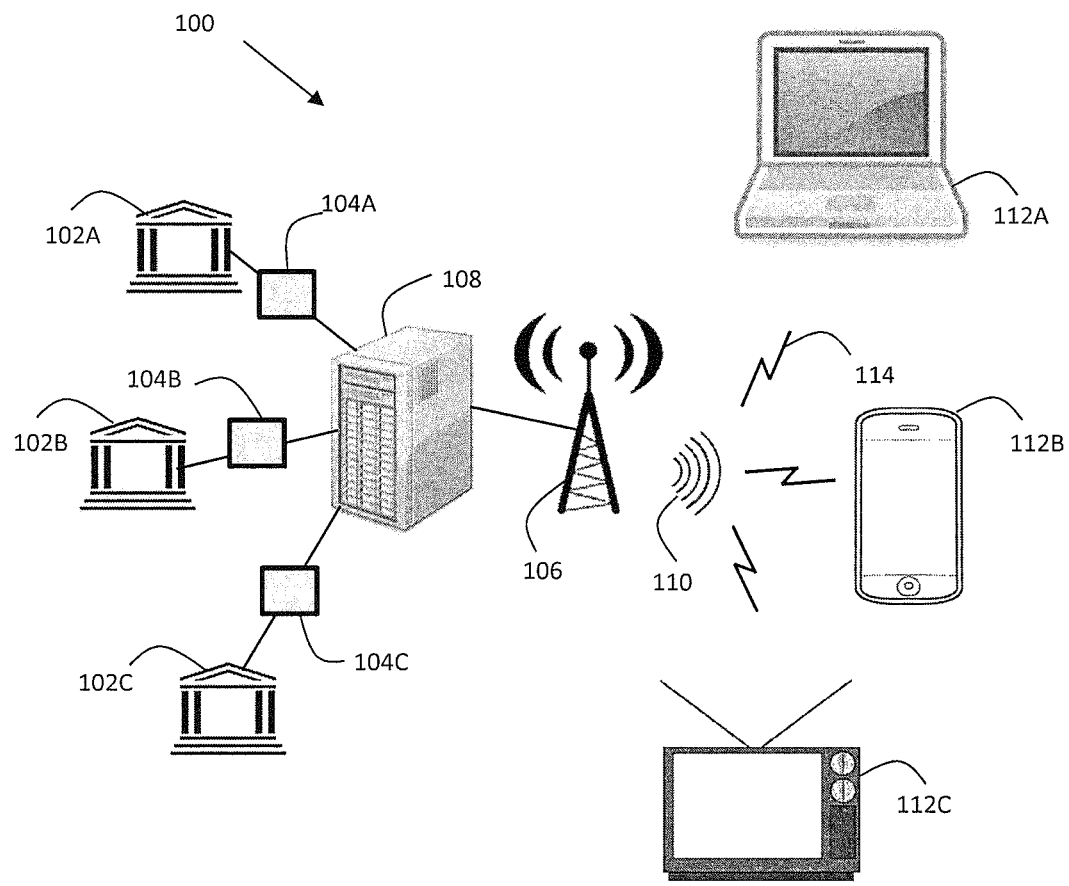
FIG. 1 illustrates an example broadcast network.

It should be appreciated that the following acronyms and abbreviations may be used herein:
SSR Baseband Sampling Rate
BW Bandwidth
CAZAC Constant Amplitude Zero Auto-Correlation
DC Direct Current
EAS Emergency Alert System
FFT Fast Fourier Transform
IEEE Institute of Electrical & Electronic Engineers
IFFT Inverse Fast Fourier Transform
kHz kilohertz
LDM Layer Division Multiplexing
LFSR Linear Feedback Shift Register
MHz Megahertz
ms millisecond
PN Pseudo-Noise
μs microsecond
ZC Zadoff-Chu FIG. 1 illustrates an example broadcast network communication system 100 including a plurality of content providers 102A, 102B, and 102C (hereinafter content provider 102) providing a variety of types of content 104A, 104B, and 104C (hereinafter content 104) via a broadcast network 106. It should be appreciated that although three content providers 102 are illustrated, system 100 may include any suitable number of content providers 102. In addition, content providers 102 may be providers of any suitable types of content, such as televisions broadcast signals, software updates, emergency alerts, and so on. It should be further appreciated that the content providers 102 may provide content 104 via either a wireless or wired connection to a gateway 108.

The content 104 is time-multiplexed, at the gateway 108, into a single RF channel 110. The broadcast receivers 112A, 112B, and 112C (hereinafter broadcast receiver 112) are configured to identify and receive the broadcast signals 114 via the RF channel 110. It should be appreciated that although three different types of broadcast receivers 112 are illustrated (a laptop computer 112A, a mobile telephone 112B, and a television 112C), system 100 may include any suitable number and type of broadcast receivers 112.

A bootstrap (not shown) indicates, at a low level, the type or form of a signal 114 that is being transmitted during a particular time period, so that the broadcast receiver 112 can discover and identify the signal 114, which in to indicates how to receive the services that are available via that signal 114. Thus, the bootstrap is relied on as an integral part of every transmit frame to allow for sync/detection and system configuration. As will be described, the bootstrap design includes a flexible signaling approach to convey frame configuration and content control information to the broadcast receiver 112. The signal design describes the mechanism by which signal parameters are modulated on the physical medium. The signaling protocol describes the specific encoding used to communicate parameter selections governing the transmit frame configuration. This enables reliable service discovery while providing extensibility to accommodate evolving signaling needs from a common frame structure. Specifically, the design of the bootstrap enables universal signal discovery independent of channel bandwidth.

The bootstrap also enables reliable detection in the presence of a variety of channel impairments such as time dispersion and multipath fading, Doppler shift, and carrier frequency offset. In addition, multiple service contexts are accessible based on mode detection during signal discovery enabling broad flexibility in system configuration. The bootstrap also facilitates extensibility to accommodate ongoing evolution in service capability based on a hierarchical signaling structure. Thus, new signal types not yet conceived, could be provided by a content provider 102 and identified within a transmitted signal 114 through the use of a bootstrap signal. Moreover, reusable bit-fields interpreted based on the detected service mode/type enable bit-efficient signaling despite the level of extensibility afforded. In one example, the bootstrap is configured to be a robust signal and detectable even at low signal levels. As a result, individual signaling bits within the bootstrap may be comparatively expensive in terms of physical resources that they occupy for transmission. Thus, the bootstrap may be intended to signal only the minimum amount of information required for system discovery and for initial decoding of the following signal.

General Bootstrap Overview

Described herein is a bootstrap, independent of an implementation example to be described later. As will be described further, ATSC 3.0 is one example implementation of the bootstrap capability and sets certain constraints to general bootstrap capability. An appreciation of these general concepts in bootstrap construction will help those skilled in art see the wide applicability of this technology in future communications systems of various bandwidths and frequency bands in RF spectrum.

Figure 2:
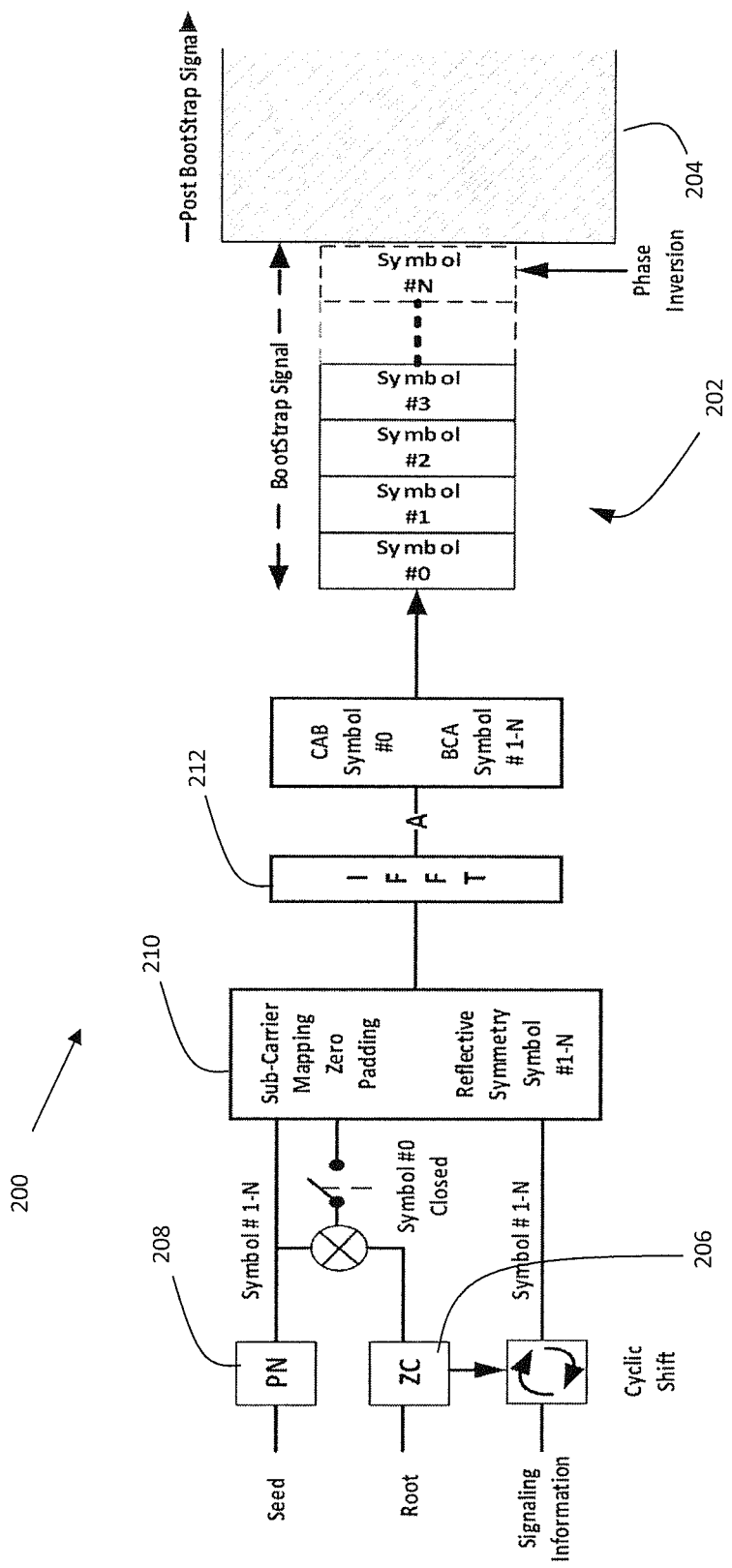
FIG. 2 illustrates an example system for originating bootstrap symbols.

FIG. 2 illustrates an example system 200 for generating a bootstrap. The bootstrap signal 202 generated by the system 200 consists of (N) OFDM symbols labeled (0-N). The frequency occupation, or bandwidth, is smaller than the post bootstrap signal 206, or waveform, by design. The post bootstrap signal 204 represents service being signaled by bootstrap and consumed by a receiver. The post bootstrap signal 204 can be any waveform enabling future flexibility and extensibility as will be discussed.

Described herein is the bootstrap signal. The baseband sampling rate (BSR) is denoted by the following equation:

$$BSR = F_s = (N+16) \times (M) \text{ or Time domain: } T_s = 1/F_s \quad \text{Equ (1)}$$

where $F_s$ is the Frequency Sampling, N is the Operational Variable to scale over bandwidth chosen, and M is Factor (MHz) to Choose Bandwidth.

The OFDM subcarrier spacing (in Hz) is defined as:

$$\Delta F = F_s / FFT_{(Size)} \quad \text{Equ (2)}$$

Where the FTT size is some power of 2 (e.g. 1024, 2048, 4096, 8192 . . . ).

In one example (ATSC 3.0) design process for the 6 MHz broadcast television bandwidth in USA, the equation, M=0.384 is chosen because of an existing relationship to LTE (based on WCDMA). Other relationships may be chosen. Thus, in this one example:

$$F_s = (0+16) \times (0.384 \text{ MHz}) = 6.144 \text{ MHz};$$

$$F_s = 6.144 \text{ MHz}, FFT_{(Size)} = 2048; \text{ and}$$

$$\Delta F = 6.144 \text{ MHz}/2048 = 3000 \text{ Hz} \quad \text{Equ (3)}$$

A Zadoff Chu sequence length $N_{(ZC)}$ is then selected (based on a prime number) to be mapped over a portion of the $FFT_{(Size)}$ to support the bandwidth chosen. Thus, $$\text{Bandwidth} = \Delta F \times (N_{(ZC)} + 1); \quad \text{Equ (4)}$$

wherein the $N_{ZC}$ is mapped to center of FFT (1500 sub-carriers including DC) and zero padding is used on remaining sub-carriers. In the ATSC 3.0 example, $N_{(ZC)}$=1499 was chosen. Thus, $$\text{Bandwidth} = 3000 \text{ (Hz)} \times (1499+1) = 4.5 \text{ MHz}$$

As a result, in the example ATSC 3.0 implementation described, the design consumes a 4.5 MHz bandwidth and has ΔF=3000 Hz which will give adequate Doppler performance (MPH) for broadcast band in mobile environment.

It should be appreciated other selections for parameters in the above general equations could enable wider bandwidths or frequency bands (Doppler), etc. In particular, although the value (N) is specified in ATSC 3.0 as 0, the full range of (0-127) is available for N. In the example illustrated, N is constrained to N=0 to achieve 6 MHz. However, it should be appreciated that, by substituting N=127, a bandwidth greater than 50 MHz can be supported. This is illustrative of the extensibility of the bootstrap.

Referring again to FIG. 2, the system further includes a Zadoff-Chu module or sequence generator 206 and a pseudo noise (PN) module or sequence generator 208. A Zadoff-Chu (ZC) sequence, is a complex-valued mathematical sequence which, when applied to radio signals results in a couple interesting properties one of which is that of constant amplitude signal. It can be defined as:

$$\text{ZC Sequence} = e^{-j\pi q[k(k+1)/N_{(ZC)}]} \quad \text{Equ (5)}$$

Figure 3:
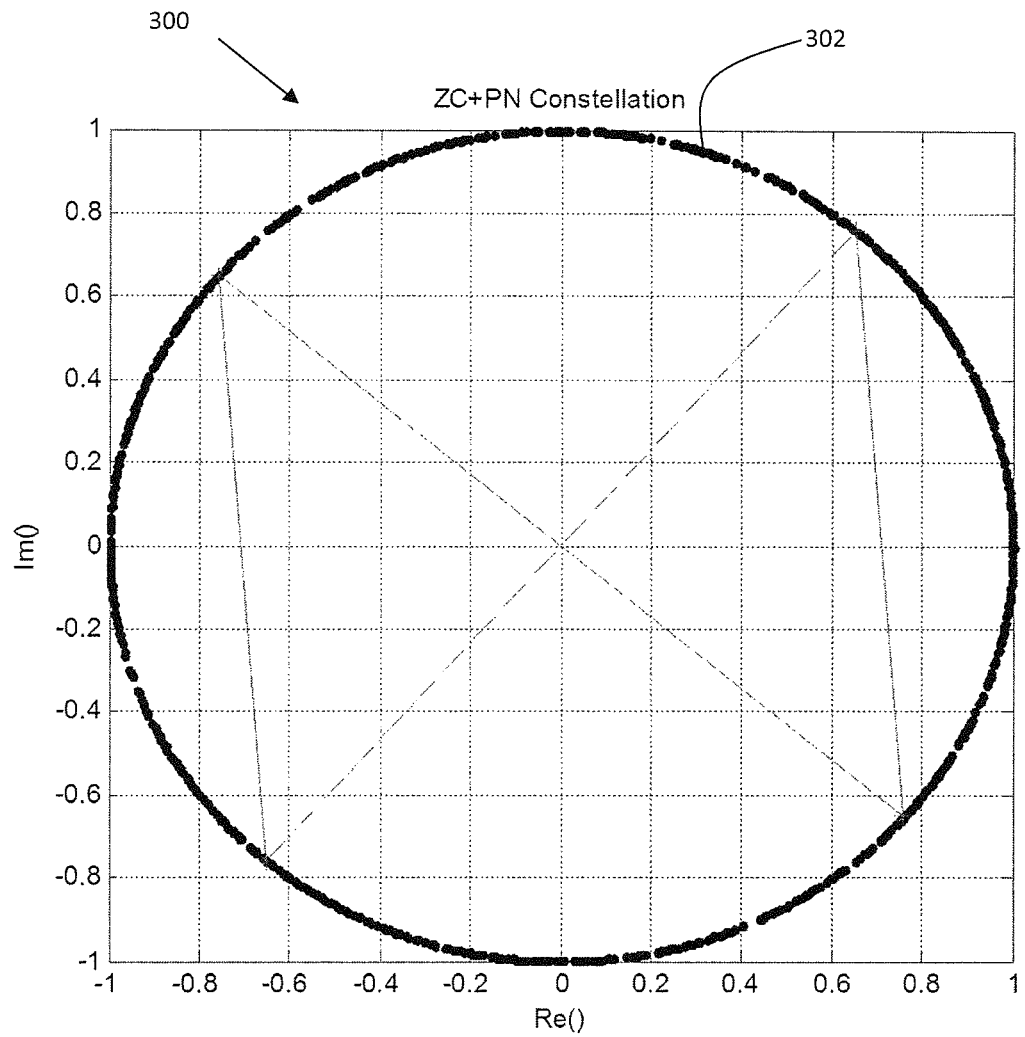
FIG. 3 illustrates a complex I/Q constellation of ZC+PN.

FIG. 3 illustrates the complex I/Q constellation 300 of ZC+PN in which each I/Q value resides on the unit circle 302 and is described as a phase around this unit circle 302, wherein the amplitude is constant.

It should be appreciated that another theoretical property of (ZC) is that different cyclically shifted versions of root sequence can be imposed on a signal and can result in ideal zero autocorrelation. A generated Zadoff-Chu sequence that has not been shifted is known as a "Root Sequence." Referring again to FIG. 2, symbol#0, which is used primarily for synchronization and versioning, has not been shifted. However, it should be appreciated that the theoretic zero autocorrelation by using a (ZC) alone isn't achieved over a large range of cyclic shifts.

As a result of this basic design requirement, the need of a large number of cyclic shifts with theoretic ideal autocorrelation was foreseen, something not natural to (ZC) alone. Then, through simulation and experiments, it was discovered and developed that by introducing a Pseudo-Noise (PN) sequence, in addition to ZC, all cyclic shifts can be enabled to approach near theoretic ideal autocorrelation.

Figure 4A:
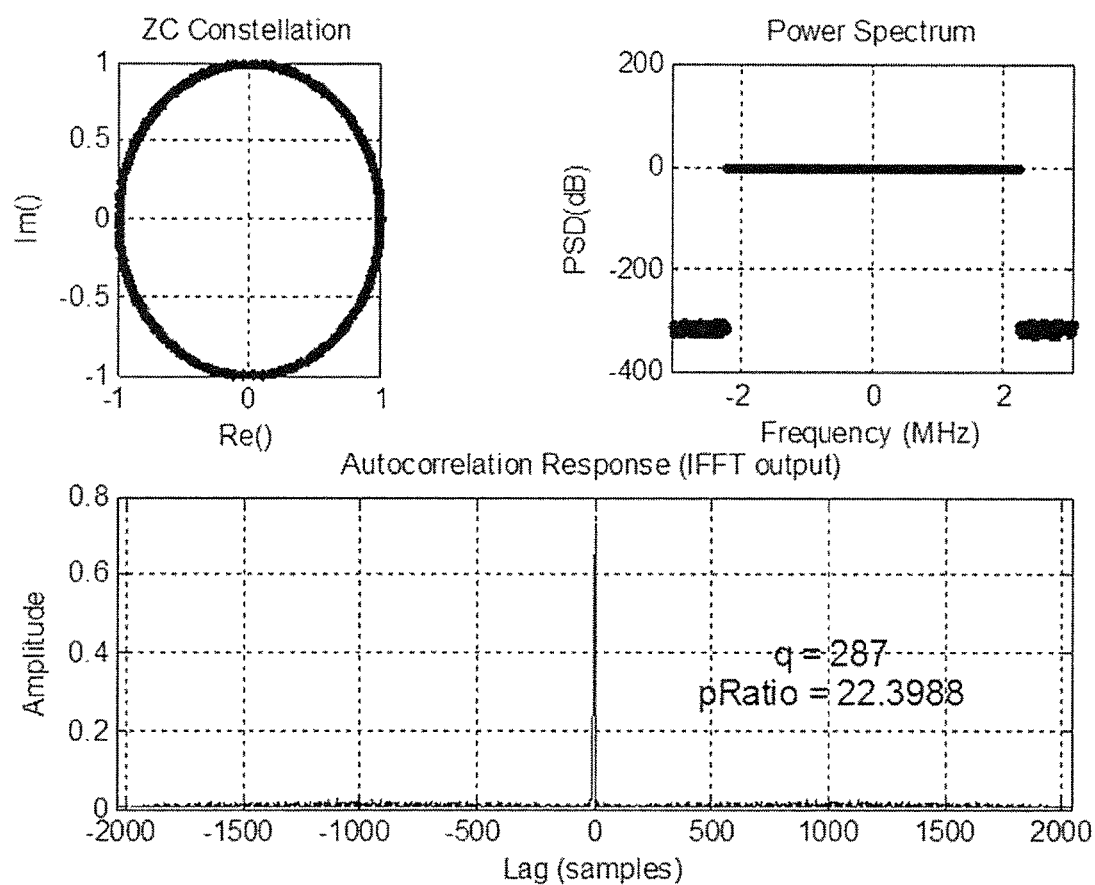
FIGS. 4A-4B, respectively, illustrate example frame control compositions.
Figure 4B:
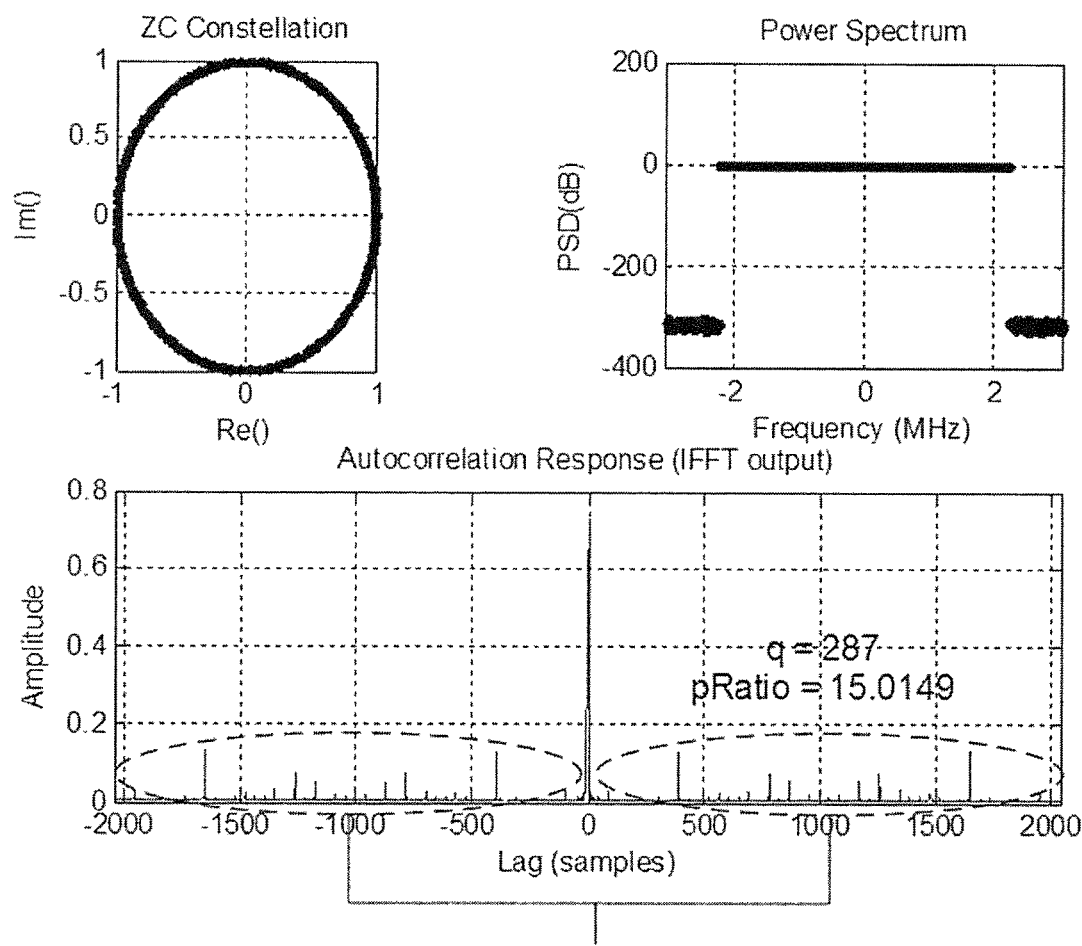

FIG. 4B shows results of simulation of just a ZC alone and resulting non-ideal autocorrelation while FIG. 4A is results of simulation of a ZC+PN and resulting near ideal autocorrelation is shown. In particular, the PN-sequence phase-rotates individual complex subcarriers retaining the desirable Constant Amplitude Zero Autocorrelation Waveform ("CAZAC") properties of the original ZC-sequence, illustrated in FIG. 3. The added phase rotation is intended to provide greater signal separation between cyclic shifts of the same root sequence suppressing spurious auto-correlation responses observed using a ZC-sequence without the addition of PN-sequence modulation, illustrated in FIG. 4B. Thus, as can be appreciated, the discovery of (ZC+PN) drastically improves the signaling robustness and the capacity (number bits per symbol) communicated by mechanism of cyclic shifts.

Referring again to FIG. 2, the first symbol #0 is a Root with no cyclic shift while Symbols 1-N carrying signaling via mechanism of cyclic shifts. Also, it is seen that mapping and zero padding is applied, by a mapping module 210, to Symbol #0. The symbols (1-N) have PN added to ZC that results in reflective symmetry as shown and will be discussed later by example.

The signal is then sent to an IFFT module 212 and converted from frequency domain to the time domain. The signal then is processed in time domain. The signal exiting IFFT is termed "A" which then has pre-fix and post-fix sections derived from "A" known as "B" and "C". The symbol #0 has a time sequence "CAB" while all other symbols have a time sequence of "BCA". It should be appreciated that the purpose of this is to add robustness and discriminate symbol #0 which is used for synchronization and versioning.

The length of bootstrap symbols is defined by:

$$T_{Symbol}[C+A+B] \times T_s \quad \text{Equ (6)}$$

In one example (ATSC 3.0), the symbol length is 500 μs.

Figure 5:
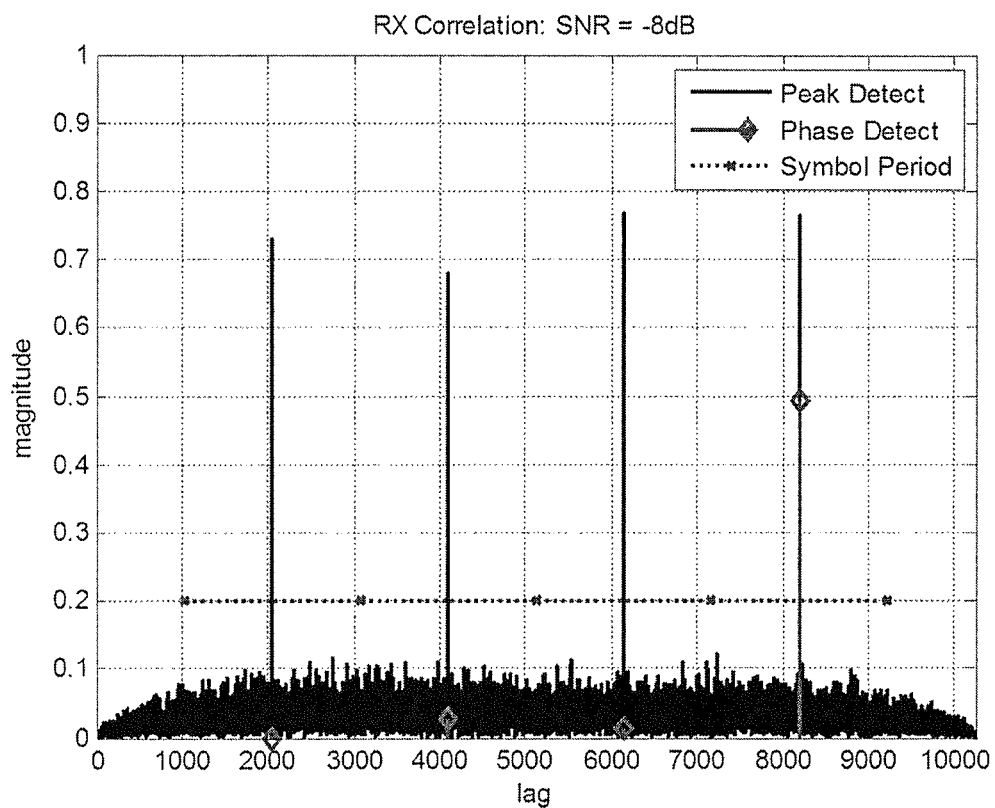
FIG. 5 illustrates example field termination signaling.

To enable capability to extend the number of symbols, a mechanism of inversion of (ZC) on the last symbol in bootstrap sequence is used, as illustrated in FIG. 5. In particular, field termination is signaled by a 180° phase inversion in the final symbol period relative to the preceding symbol period. Thus, instead of needing to specify in advance how long a single is going to be in order for the receiver to be able to identify the end of a signal, the receiver is instead able to look for an inverted symbol in the signal which would indicate the end of the signal. This allows for the bootstrap to be flexible and extensible since advance knowledge of how long a signal is going to be isn't necessary. Thus, instead of defining a bootstrap length in advance, and either wasting extra space or not reserving enough space (in which case it may not be possible to completely transmit the intended information), the length of the bootstrap is flexible in that it can be discovered. Moreover, an inverted signal may be relatively easy to detect and therefore not require significant additional resources to implement.

It should be appreciated that the receiver will gracefully ignore a Major version (Root) that it doesn't understand. This ensures extensibility without disrupting legacy receivers in future. In fact, one such signaling method is provided by ATSC 3.0 to be discussed later and is illustrated by Table 2 herein.

Figure 6:
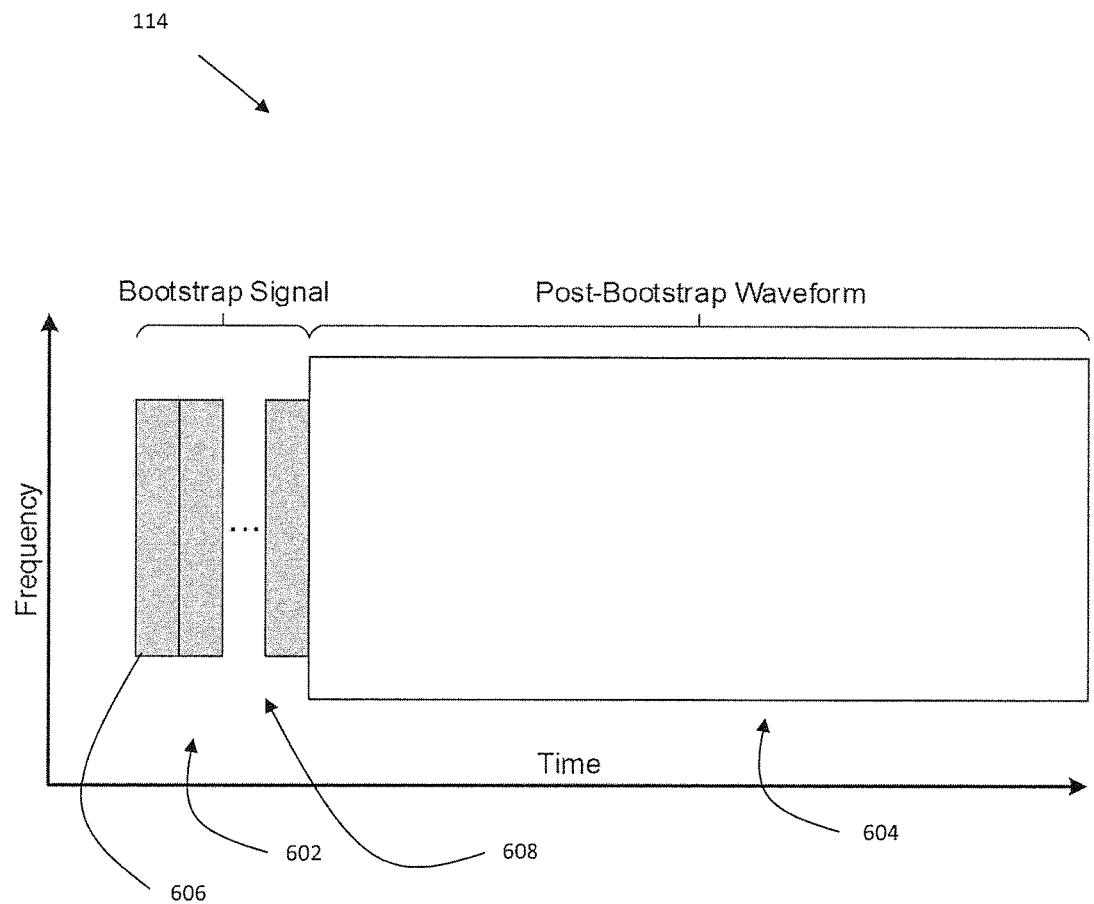
FIG. 6 illustrates an example signal waveform illustrated in FIG. 1.

FIG. 6 illustrates an example signal waveform 114 illustrated in FIG. 1. The signal waveform 114 includes a bootstrap 602 followed by a post-bootstrap waveform 604 or the remainder of the waveform. The bootstrap 602 provides a universal entry point into the signal waveform 114. It employs a fixed configuration (e.g. sampling rate, signal bandwidth, subcarrier spacing, time domain structure) known to all broadcast receivers 112.

It should be appreciated that having a flexible or variable sampling defined in the bootstrap offers flexibility previously unavailable. In particular, rather than designing a solution for a specific service having a fixed or defined sampling rate as a function of bandwidth, a flexible sampling rate enable scaling for a variety of different bandwidths in order to accommodate diverse services with different requirements and constraints. Thus, the same system for synchronization and discovery can be used for a large range of bandwidths and can serve a large band, since different sections of a band may be better suited for different types of services.

The bootstrap 602 may consist of a number of symbols. For example, the bootstrap 202 may begin with a synchronization symbol 606 positioned at the start of each waveform to enable service discovery, coarse synchronization, frequency offset estimation, and initial channel estimation. The remainder 608 of the bootstrap 602 may contain sufficient control signaling to permit the reception and decoding of the remainder of the signal waveform 114 to begin.

The bootstrap 602 is configured to exhibit flexibility, scalability, and extensibility. For example, the bootstrap 602 may implement versioning for increased flexibility. Specifically, bootstrap 602 design may enable a major version number (corresponding to a particular service type or mode) and a minor version (within a particular major version). In one example, the versioning may be signaled (as will be described) via appropriate selection of a Zadoff-Chu root (major version) a Pseudo-Noise sequence seed (minor version) used for generating the base encoding sequence for bootstrap symbol contents. The decoding of signaling fields within the bootstrap 602 can be performed with regard to the detected service version, enabling hierarchical signaling where each assigned bit-field is reusable and is configured based on the indicated service version. The syntax and semantics of signaling fields within the bootstrap 612 may be specified, for example, within standards to which the major and minor version refers.

In order to further exhibit scalability and extensibility, the number of bits signaled per bootstrap 602 symbol can be defined, up to a maximum, for a particular major/minor version. The maximum number of bits per symbol defined by the equation:

$$(N_{bps} = \lfloor \log_2(N_{FFT}/\text{CyclicShiftTol}) \rfloor) \quad \text{Equ (7)}$$

where is dependent on the desired cyclic shift tolerance which in turn is dependent on expected channel deployment scenarios and environments. If available, additional new signaling bits can be added to existing symbols in a backward compatible manner without requiring a change to the service version.

As a result, the bootstrap 602 signal duration is extensible in whole symbol periods, with each new symbol carrying up to $N_{bps}$ additional signaling bits. Bootstrap 602 signal capacity may thus be dynamically increased until field termination is reached.

Figure 7:
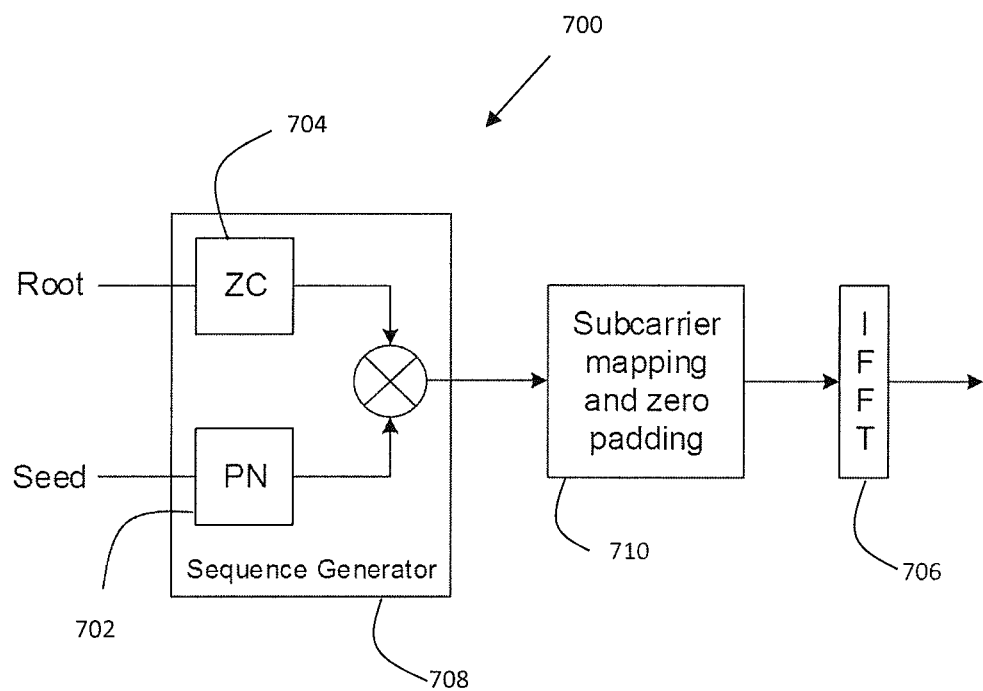
FIG. 7 illustrates an example system for originating bootstrap symbols.

FIG. 7 illustrates an example system 700 for originating bootstrap 602 symbols. As described, the values used for each bootstrap 602 symbol originate in the frequency domain with a Zadoff-Chu (ZC) sequence 704 modulated by a Pseudo-Noise (PN) cover sequence 702 with a sequence generator 708. The ZC-root 704 and PN-seed 702 determine the service's major and minor versions, respectively. The resulting complex sequence is applied per subcarrier at the Inverse Fast Fourier Transform ("IFFT") input 706. The system 700 further includes a sub-carrier mapping module 710 for mapping output of the sequence generator 708 to the IFFT input 706. The PN sequence 702 introduces a phase rotation to individual complex subcarriers retaining the desirable Constant Amplitude Zero Auto-Correlation (CA-ZAC) properties of the original ZC sequence 704. The PN sequence 702 further suppresses spurious emissions in the autocorrelation response, thereby providing additional signal separation between cyclic shifts of the same root sequence.

It should be further appreciated that modulating a ZC sequence with a pseudo-noise sequence in particular, gives the waveform different characteristics that makes it easily discoverable. In particular, modulating with a PN sequence results in near ideal correlation with less uncertainty. Such a combination was discovered through simulation after testing many combinations of algorithms and sequences. In particular, modulating a ZC sequence with a PN sequence produced the unexpected result of producing a signal that is easy to correlate to with no spurious signals created during correlation. This leads to a signal which is easily discoverable, meaning a receiver may correlate with the signal even in high noise settings.

Bootstrap—Implementation (ATSC 3.0 Example)

Described herein is an example implementation of the example bootstrap 602. It should be appreciated that although the examples described herein may refer to a specific implementation of as bootstrap, it is contemplated that the bootstrap 602 will have broader applications beyond the example illustrated below.

Bootstrap Specification—Dimensions

In one example, the bootstrap 602 structure is intended to remain fixed even as version numbers and/or the other information signaled by the bootstrap 602 evolves. In one example, the bootstrap 602 uses a fixed sampling rate of 6.144 Msamples/second and a fixed bandwidth of 4.5 MHz, regardless of the channel bandwidth used for the remainder of the waveform 604. The time length of each sample is also fixed by the sampling rate. Thus, $$f_s = 6.144 \text{ Ms/sec}$$

$$T_s = 1/f_s$$

$$BW_{Bootstrap} = 4.5 \text{ MHz} \quad \text{Equ (8)}$$

An FFT size of 2048 results in a subcarrier spacing of 3 kHz.

$$N_{FFT}=2048$$

$$f_\Delta=f_s/N_{FFT}=3 \text{ kHz} \qquad \text{Equ (9)}$$

In this example, each bootstrap 602 symbol has a time duration of ~333.33 µs. When processed in time domain to be discussed later using (CAB or BCA) the exact length of $T_{symbol}$ is 500 µs. The overall time duration of the bootstrap 602 depends on the number of bootstrap 602 symbols, which is specified as $N_s$. A fixed number of bootstrap 602 symbols shall not be assumed.

$$T_{symbol}=500 \text{ µs} \qquad \text{Equ (10)}$$

It should be appreciated that a 4.5 MHz bandwidth may be selected based on current industry consensus, which also covers 5 MHz as a lowest bandwidth in common use and smaller than 6 MHz broadcast in this example. Thus, the baseband sampling rate can be calculated using:

$$(N+16)\times 0.384 \text{ MHz}=6.144 \text{ MS/sec.}(N=0 \text{ bootstrap}) \qquad \text{Equ (11)}$$

Selecting a 2048 FFT length, which has good gain, results in a Δf of 3 KHz which gives good Doppler performance. It should be appreciated that a similar system can be implemented for other sections of the band. For example, variation of the same formula, in which the formula and N value would be optimized for that specific bandwidth could be used for other bandwidths such as 20 MHz.

It should be appreciated that basing the BSR formula on a 0.384 MHz factor, which is related to LTE systems (and a relationship to WCDMA), a new system may be able to work off of oscillator(s) used for other implementations. In addition, all 3GPP LTE baseband sampling rates for all current bandwidths described in standards today can also be calculated from the formula by inserting value (N). Thus, adopting the formula allows for future versions of equipment that contain some sort variation of LTE variation to still work. However, it should be appreciated that the BSR formula may similarly be based on other suitable factors.

It should be further appreciated that although examples described herein utilize a selected FFT size of 2048, other suitable FFT sizes may similarly be used. A receiver must first synchronize and identify an incoming signal so that it can begin decoding its information. A longer signaling sequence however, such as an FFT size of 2048, has a higher gain and is therefore easier to discover since the amount of information the receiver has available to find, or correlate to, is larger.

In existing cellular communication, the gain may not be a factor since communication occurs in a unicast nature and primary synchronization signal (PSS) is frequently inserted for random access by multiple users. Moreover, broadcasters may not have been concerned about gain in the past since broadcast may have been generally intended for static receivers that were on high grounds. However, when broadcasting to mobile device or to locations with poor reception, higher gain may become more important. A mobile device, however, may not have an optimal antenna shape to rely on for gain and may not be ideally positioned for best reception and therefore mathematical gain may be relied on.

Therefore, longer signal lengths, such as the example FFT=2048, provides longer sequences to correlate to and therefore results in more robust reception. For example, with a longer signal, the bootstrap may be discoverable in underground locations, below the noise floor. In addition, longer signal lengths also enable more unique sequences. For example, each transmitter can be assigned unique sequence and receivers can then search for sequences independently. This information can be used, by Global Positioning System (GPS) systems for example, to calculate a position of the receiver using TDOA techniques, is not discussed herein.

It should be appreciated that, although other suitable signal lengths may be chosen, a signal length of 2048 has been identified herein in order to optimize performance. In particular, choosing a different signal length may result in tradeoffs between different parameters, including the amount of gain which could impact performance.

Bootstrap Specification—Frequency Domain Sequence

In one example, the Zadoff-Chu (ZC) sequence has length $N_{ZC}=1499$, where this is the largest prime number that results in a channel bandwidth no greater than 4.5 MHz with a subcarrier spacing of $f_\Delta=3$ kHz. The ZC sequence is parameterized by a root q, which corresponds to a major version number:

$$z_q(k) = e^{-j\pi q \frac{k(k+1)}{N_{ZC}}} \qquad \text{Equ (12)}$$

where $$q \in \{1,2,\ldots,N_{ZC}-1\}$$

and $$k=0,1,\ldots,N_{ZC}-1.$$

The use of a pseudo-noise sequence to modulate the ZC sequence has allowed for the relaxation of constrains on the ZC root. While previous signaling methods that utilized ZC (e.g. LTE Primary Synchronization Sequence) were limited to selecting prime roots to assure good autocorrelation properties, in this system, the PN modulation allows for good autocorrelation even when non-prime roots are selected for ZC. Having non-prime roots for ZC allows for the creation of more waveforms, allowing the system to signal more types of services, i.e. creating a more extensible system.

Figure 8:
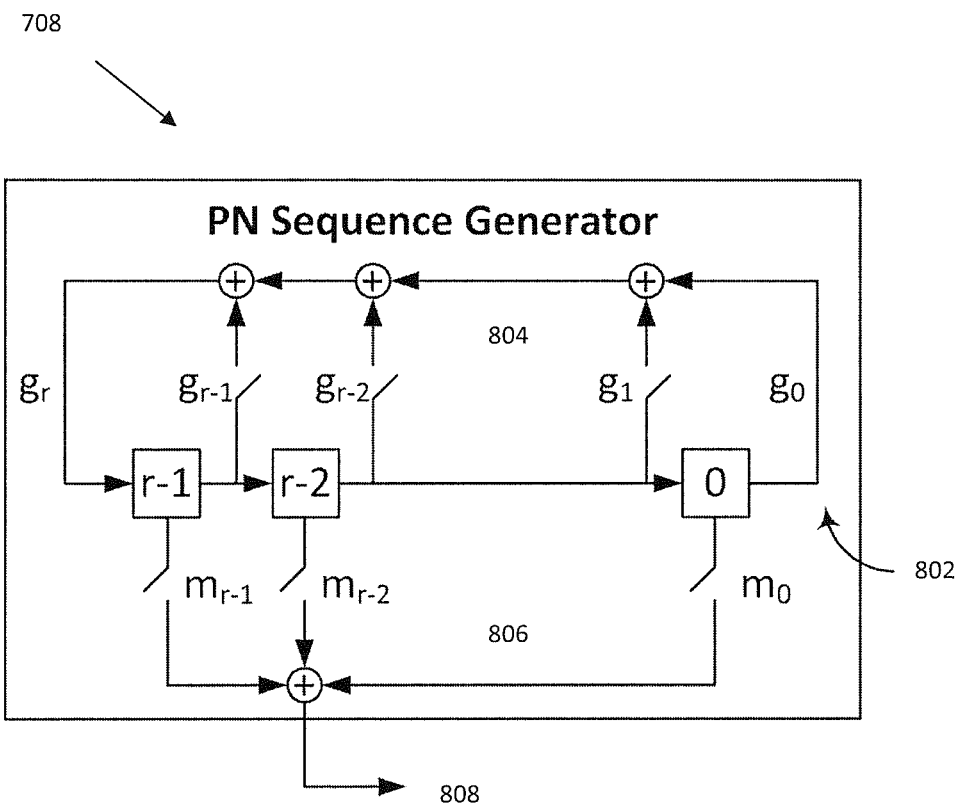
FIG. 8 illustrates an example PN sequence generator.

FIG. 8 illustrates an example PN sequence generator 708. The PN sequence generator 808 is derived from a Linear Feedback Shift Register (LFSR) 802 of length (order) l=16. Its operation is governed by a generator polynomial 804 specifying the taps in the LFSR feedback path followed by a mask 806 specifying the elements that contribute to the sequence output 808. Specification of the generator polynomial 804 and initial state of the registers represents a seed, which corresponds to a minor version number. That is, a seed is defined as f(g, $r_{init}$).

The PN sequence generator registers 802 are re-initialized with the initial state from the seed prior to the generation of the first symbol in a new bootstrap 602. The PN sequence generator 708 continues to sequence from one symbol to the next within a bootstrap 602 and is not re-initialized for successive symbols within the same bootstrap 602.

The output of the PN sequence generator 708 is defined as p(k) which will have a value of either 0 or 1. p(0) shall be equal to the PN sequence generator output after the PN sequence generator 708 has been initialized with the appropriate seed value and before any clocking of the shift register 802. A new output p(k) shall subsequently be generated every time the shift register 802 is clocked on position to the right. Thus, in one example, the generator polynomial 804 for the PN sequence generator 708 shall be defined as:

$$g=\{g1, \ldots, g0\}=\{1,1,1,0,0,0,0,0,0,0,0,0,0,0,1,1\} \quad \text{Equ (13)}$$

where $$p(x)=x^{16}+x^{15}+x^{14}+x+1$$

Figure 9:
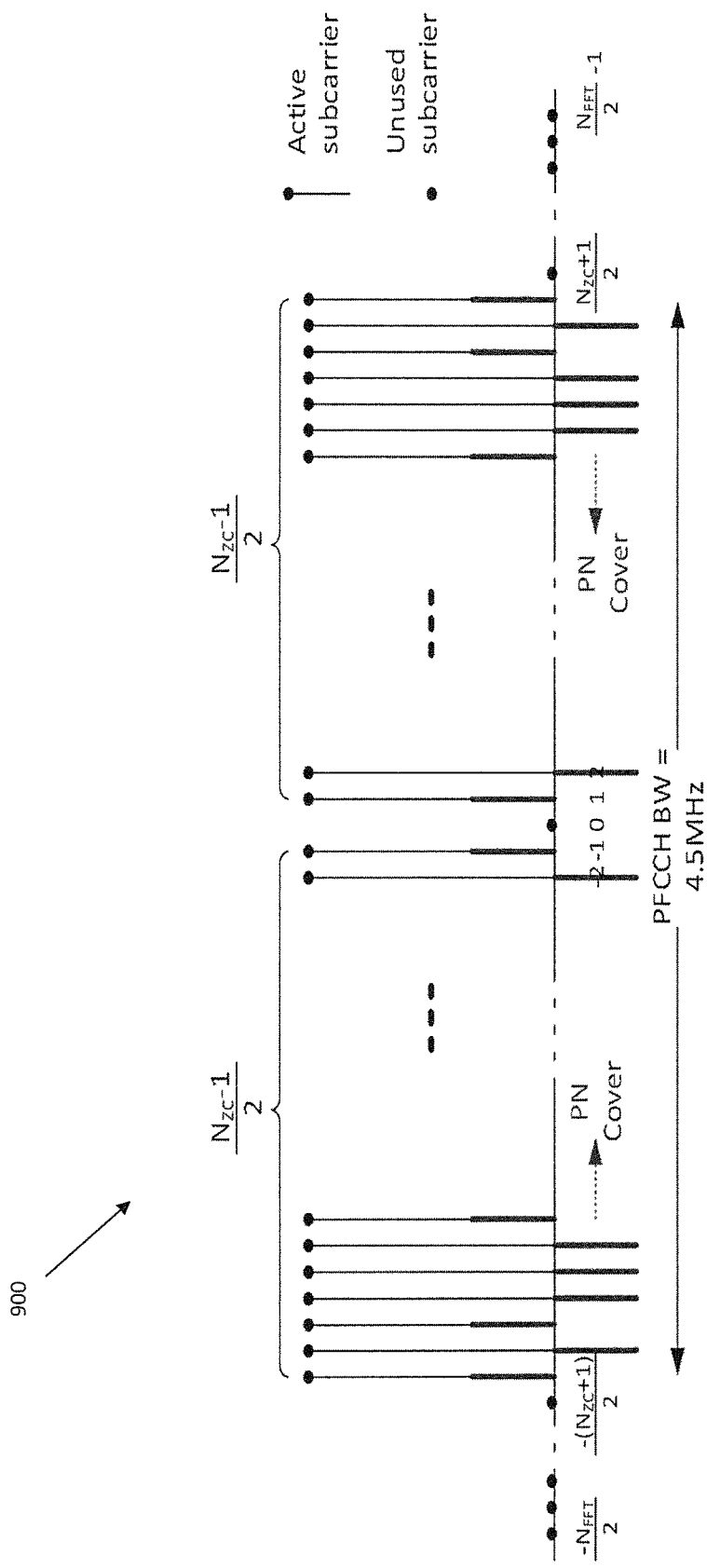
FIG. 9 is an example illustration of the mapping of frequency domain sequence to subcarriers.

FIG. 9 is an example illustration of the mapping 900 of frequency domain sequence to subcarriers. The ZC-sequence value that maps to the DC subcarrier (i.e. $z_q((N_{ZC}-1)/2)$) is zeroed so that the DC subcarrier is null. The subcarrier indices are illustrated with the central DC subcarrier having index 0.

The product of the ZC and the PN sequences has reflective symmetry about the DC subcarrier. The ZC sequence has a natural reflective symmetry about the DC subcarrier. A reflective symmetry of the PN sequence about the DC subcarrier is introduced by mirror-reflecting the PN sequence values assigned to subcarriers below the DC subcarrier to the subcarriers above the DC subcarrier. For example, as illustrated the PN sequence values at subcarriers −1 and +1 are identical, as are the PN sequence values at subcarriers −2 and +2. As a result, the product of the ZC and PN sequences also has reflective symmetry about the DC subcarrier.

It should be appreciated that the symmetry described herein enables a more robust signal, making it easier to discover. In particular, the symmetry acts as an additional aid for discovery (i.e. additional gain). This is an additional feature of the signal that the receiver can look for, making it easier to find. Thus, it is one of the elements that allows the bootstrap to be recognized even below the noise floor.

As the mapping 900 illustrates, the subcarrier values for the n-th symbol of the bootstrap ($0 \leq n < N_s$) may be expressed as:

$$s_n(k) = \begin{cases} z_q(k+N_H) \times c((n+1) \times N_H + k) & -N_H \leq k \leq -1 \\ z_q(k+N_H) \times c((n+1) \times N_H - k) & 1 \leq k \leq N_H \\ 0 & \text{otherwise} \end{cases} \quad \text{Equ (14)}$$

where $$N_H=(N_{ZC}-1)/2$$

and $$c(k)=1-2 \times p(k)$$

with c(k) having either the value +1 or −1. It should be appreciated that the ZC sequence is the same for each symbol, while the PN sequence advances with each symbol.

In one example, the final symbol in the bootstrap is indicated by a phase inversion (i.e. a rotation of 180°) of the subcarrier values for that particular symbol. This bootstrap termination signaling enables extensibility by allowing the number of symbols in the bootstrap to be increased for additional signaling capacity in a backwards compatible manner without requiring the major or minor version numbers to be changed. The phase inversion simply involves multiplying each subcarrier value by $e^{j\pi}=-1$:

$$\tilde{s}_n(k) = \begin{cases} s_n(k) & 0 \leq n < N_s - 1 \\ -s_n(k) & n = N_s - 1 \end{cases} \quad \text{Equ (15)}$$

This phase inversion enables receivers to correctly determine the end point of the bootstrap. For example, a receiver may determine the endpoint of a bootstrap for a minor version that is later than the minor version for which the receiver was designed and that has been extended by one or more bootstrap symbols. As a result, receivers do not need to assume a fixed number of bootstrap symbols. In addition, receivers may ignore the signaling bit contents of a bootstrap symbol that the receiver has not been provisioned to decode but still detect the presence of the bootstrap symbol itself.

Once mapped, the frequency domain sequence is then translated to the time domain via a $N_{FFT}=2048$ point IFFT:

$$\tilde{A}_n(t) = \sum_{k=-(N_{ZC}-1)/2}^{-1} \tilde{S}_n(k) e^{j2\pi f \Delta T_S t} + \sum_{k=1}^{(N_{ZC}-1)/2} \tilde{S}_n(k) e^{j2\pi f \Delta T_S t} \quad \text{Equ (16)}$$

Bootstrap Specification—Symbol Signaling

Information is signaled via the bootstrap symbols through the use of cyclic shifts in the time domain of the $A_n(t)$ time domain sequence. This sequence has a length of $N_{FFT}=2048$ and thus 2048 distinct cyclic shifts are possible (from 0 to 2047, inclusive). With 2048 possible cyclic shifts, up to $\log_2(2048)=11 \log_2(2048)=11$ bits can be signaled. It should be appreciate that not all of these bits will actually be used. In particular, $N_b^n$ represents the number of signaling bits that are used for the n-th bootstrap symbol ($1 \leq n < N_s$), and $b_o^n, \ldots, b_{N_b^n-1}^n$ represent the values of those bits.

The number of active signaling bits in a received bootstrap symbol may be greater than the number of signaling bits $N_b^n$ expected by a receiver. To facilitate future signaling expansion while maintaining backwards compatibility, a receiver shall not assume that the number of active signaling bits in a received bootstrap symbol is no greater than the number of signaling bits n expected by that receiver. For example, $N_b^n$ for one or more specific bootstrap symbols may be increased when defining a new minor version within the same major version in order to make use of previously unused signaling bits while still maintaining backward compatibility. Thus, a receiver provisioned to decode the signaling bits for a particular major/minor version may ignore any new additional signaling bits that may be used in a later minor version within the same major version.

It should be appreciated that, in the examples described herein, the distance between correlation peaks between a symbol's bootstrap in the time domain is what encodes signaling information. In particular, the symbol#0 is the reference point (absolute shift) and the distance between that and the subsequent peaks (relative to the first one) carries information. The meaning of that distance can be determined from a defined lookup table, for example. Thus, the receiver is not trying to decode bits but is instead trying to identify correlation peaks. Once the receiver finds a peak, it waits for the next one, and the time between those holds signaling information. This creates a more robust system since time difference between peaks is easier to discover in high noise conditions, even though using 256 cyclic shifts, for example, to represent 8 bits of binary information may be relatively expensive. Actual signaling for the payload following the bootstrap, however, may still include a modulation scheme with actual bits that carry information.

In one example, a cyclic shift is represented as $\tilde{M}_n$ ($0 \leq \tilde{M}_n < N_{FFT}$) for the nth bootstrap symbol ($1 \leq n < N_s$) relative to the cyclic shift for the previous bootstrap symbol. $\tilde{M}_n$ is calculated from the signaling bit values for the n-th bootstrap symbol using a Gray code method. $\tilde{M}_n$ is represented in binary form as a set of bits $m_{10}{}^n$ $m_9{}^n$ ... $m_1{}^n$ $m_0{}^n$. Each bit of $\tilde{M}_n$ be computed as follows:

$$m_i^n = \begin{cases} \left(\sum_{k=0}^{10-i} b_k^n\right) \mod 2 & i > 10 - N_b^n \\ 1 & i = 10 - N_b^n \\ 0 & i < 10 - N_b^n \end{cases} \quad \text{Equ (17)}$$

where the summation of the signaling bits followed by the modulo operation effectively performs a logical exclusive OR operation on the signaling bits in question.

This equation ensures that the relative cyclic shift $\tilde{M}_n$ is calculated to provide the maximum tolerance to any errors at the receiver when estimating the relative cyclic shift for a received bootstrap symbol. If the number of valid signaling bits $N_b^n$ for a specific bootstrap symbol is increased in a future minor version within the same major version, the equation also ensures that the relative cyclic shifts for that future minor version bootstrap symbol will be calculated in such a manner that will still allow a receiver provisioned for an earlier minor version to correctly decode the signaling bit values that it is provisioned to decode, and hence backward compatibility will be maintained.

It should be appreciated that in general, the expected robustness of signaling bit $b_i^n$ will be greater than that of $b_k^n$ if $i<k$.

In one example, the first bootstrap symbol is used for initial time synchronization and signals the major and minor version numbers via the ZC-root and PN-seed parameters. This symbol does not signal any additional information and hence always has a cyclic shift of 0.

The differentially-encoded absolute cyclic shift, $M_n(0 \leq M_n < N_{FFT})$, applied to the nth bootstrap symbol is calculated by summing the absolute cyclic shift for bootstrap symbol n−1 and the relative cyclic shift for bootstrap symbol n, modulo the length of the time domain sequence:

$$M_n = \begin{cases} 0 & n = 0 \\ (M_{n-1} + \tilde{M}_n) \mod N_{FFT} & 1 \leq n < N_S \end{cases} \quad \text{Equ (18)}$$

The absolute cyclic shift is then applied to obtain the shifted time domain sequence from the output of the IFFT operation:

$$A_n(t) = \tilde{A}_n((t+M_n) \mod N_{FFT}) \quad \text{Equ (19)}$$

Bootstrap Specification—Time Domain Structure

Each bootstrap symbol is composed of three parts: A, B, and C, where each of these parts consists of a sequence of complex-valued time domain samples. Part A is derived as the IFFT of the frequency domain structure with an appropriate cyclic shift applied, while B and C are composed of samples taken from A with a frequency shift of $\pm f_{\Delta}$ (equal to the subcarrier spacing) and a possible phase shift of $e^{-j\pi}$ introduced to the frequency domain sequences axed for calculating the samples of part B. Parts A, B, and C include $N_A=N_{FFT}=2048$, $N_B=504$, and $N_C=520$ samples, respectively. Each bootstrap symbol consequently contains $N_A+N_B+N_C=3072$ samples for an equivalent time length of 500 μs.

In one example, a time domain structure includes two variants: CAB and BCA. The initial symbol of the bootstrap (i.e. bootstrap symbol 0), provided for sync detection, employs the C-A-B variant. The remaining bootstrap symbols (i.e. bootstrap symbol n where $1 \leq n < N_s$) conforms to the B-C-A variant up to and including the bootstrap symbol that indicates field termination.

It should be appreciated that repeating a portion of the bootstrap allows for improved initial synchronization and discovery since the receiver knows to expect this repetition in a particular order and there makes the signal easier to discover and lock onto, even in high noise conditions.

Figure 10A:
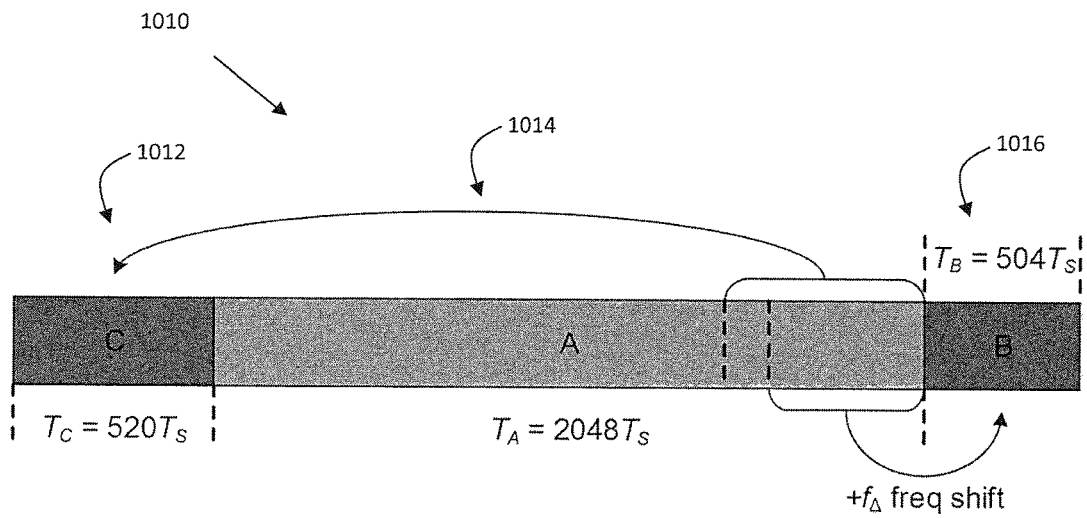
FIGS. 10A-10B illustrate example time domain structures.

FIG. 10A illustrates an example CAB structure 1010. In this example, part C 1012 is composed of the last $N_C=520$ samples of A 1014 and part B 1016 is composed of the last $N_B=504$ samples of part A 1014 with a frequency shift of $+f_{\Delta}$ and a phase shift of $e^{-j\pi}$ applied to the originating frequency domain sequence $S_n(k)$ used for calculating part A 1014. The samples for part B 1016 can be taken as the negation of the last $N_B$ samples of a cyclically shifted time domain sequence calculated, where the input frequency domain sequence is equal to $S(k)$ shifted one subcarrier position higher in frequency (i.e. $S_n(k)=S_n((k-1+N_{FFT}) \mod N_{FFT})$, with $S_n(k)$ being the input frequency domain sequence for generating the frequency-and-phase shifted samples for part B 1016). Alternatively, the frequency and phase shifts for generating the part B 1016 samples can be introduced in the time domain by multiplying the appropriately extracted samples from part A 1014 by $e^{j2\pi f_{\Delta} t}$ as shown in equation:

$$S_{CAB}^n(t) = \begin{cases} A_n(t+1528T_S) & 0 \leq t < 520T_S \\ A_n(t-520T_S) & 520T_S \leq t < 2568T_S \\ A_n(t-1024T_S)e^{j2\pi f_{\Delta} t} & 2568T_S \leq t < 3072T_S \\ 0 & \text{otherwise} \end{cases} \quad \text{Equ (20)}$$

Figure 10B:
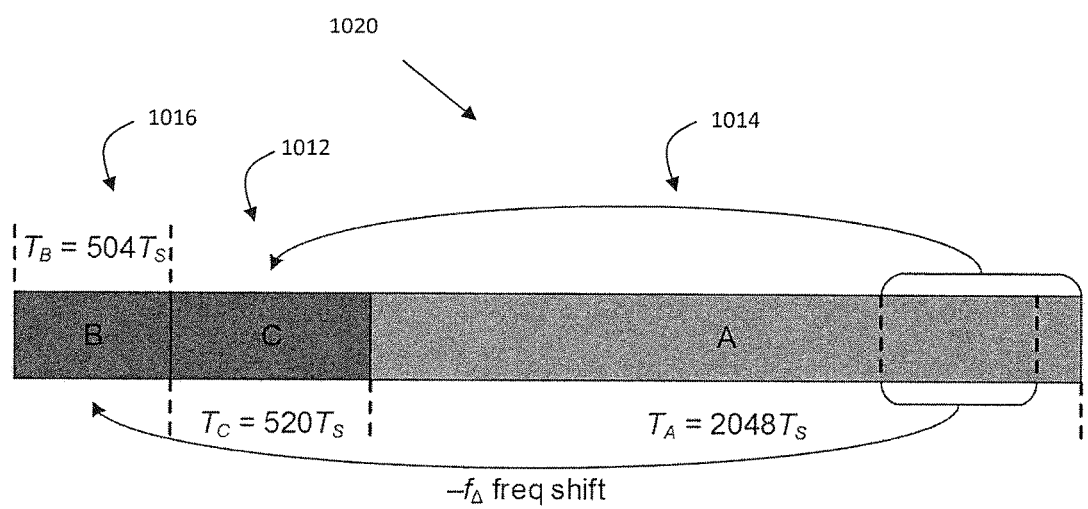

FIG. 10B illustrates an example BCA structure 1020. In this example, part C 1012 is again composed of the last $N_C=520$ samples of A 1014, but B 1016 is composed of the first $N_B=504$ samples of C 1012 with a frequency shift of $-f_{\Delta}$ applied to the originating frequency domain sequences $S_n(k)$ used for calculating part A 1014. In a similar fashion to that described with respect to example CAB structure 1010, samples for part B 1016, can be taken as the last $N_B$ samples of a cyclically shifted time domain sequence calculated, where the input frequency domain sequence is equal to $S_n(k)$ shifted one subcarrier position lower in frequency (i.e. $S_n(k)=S_n((k-1) \mod N_{FFT})$, with $S_n(k)$ being the input frequency domain sequence for generating the frequency-shifted samples for part B 1016). The frequency shift for generating the part B 1016 samples can alternatively be introduced in the time domain by multiplying the appropriate samples from part A 1014 by $e^{-j2\pi f_{\Delta} t}$ with a constant time offset of −520 T, being included to account for the correct extraction of the appropriate samples part A 1014, as illustrated in the equation:

$$S_{BCA}^n(t) = \begin{cases} A_n(t+1528T_S)e^{-j2\pi f_{\Delta}(t-520)} & 0 \leq t < 504T_S \\ A_n(t-1024T_S) & 504T_S \leq t < 1024T_S \\ A_n(t-1024T_S) & 1024T_S \leq t < 3072T_S \\ 0 & \text{otherwise} \end{cases} \quad \text{Equ (21)}$$

It should be appreciated that the samples for part B 1016 may be taken from slightly different sections of part A 1014 for each of the CAB structure 1010 and the BCA structure 1020.

Bootstrap Signal Structure

An example bootstrap signal structure is described herein. A signaling set or structure includes configuration parameter values, a list of control information fields, and an assignment of those values and fields to specific signaling bits. It should be appreciated that a bootstrap signal structure may take other suitable forms, different than the example described herein.

The example bootstrap signal structure described herein may apply when a major version number is equal to 0. The corresponding ZC sequence root (q) is 137. The base number of symbols (including the initial synchronization symbol) in the bootstrap shall be $N_s=4$. It should be appreciated that $N_s=4$ represents the minimum number of symbols that can be transmitted. Thus, to enable the transmission of additional signaling bits, $N_s=4$ represents the minimum number of symbols (but not necessarily the maximum) that shall be transmitted within a bootstrap signal.

In one example, the generator polynomial for the Pseudo-Noise sequence generator is defined as:

$$g=\{g_1,\ldots,g_0\}=\{1,1,1,0,0,0,0,0,0,0,0,0,0,0,1,1\}=[16\ 15\ 14\ 1\ 0]$$

$$p(x)=x^{16}+x^{15}+x^{14}+x+1 \quad \text{Equ (22)}$$

and the initial register state for the Pseudo-Noise sequence generator is defined as:

$$r_{init}=\{r_{t-1},\ldots,r_0\}=\{0,0,\ldots,0,1\} \quad \text{Equ (23)}$$

In one example, the initial register state of the PN sequence generator for a selected bootstrap minor version within a given major version is set to a value from a predefined list of values in order to signal the corresponding minor version that is in use. Table 1 illustrates example initial register states of a PN sequence generator for respective minor versions.

TABLE 1

Initial Register State of PN Sequence Generator
$r_{init} = (r_{t-1}, \ldots, r_0)$

| Bootstrap Minor Version | Binary | Hexadecimal |
| --- | --- | --- |
| 0 | 0000 0001 1001 1101 | 0x019D |
| 1 | 0000 0000 1110 1101 | 0x00ED |
| 2 | 0000 0001 1110 1000 | 0x01E8 |
| 3 | 0000 0000 1110 1000 | 0x00E8 |
| 4 | 0000 0000 1111 1011 | 0x00FB |
| 5 | 0000 0000 0010 0001 | 0x0021 |
| 6 | 0000 0000 0101 0100 | 0x0054 |
| 7 | 0000 0000 1110 1100 | 0x00EC |

The bootstrap signal structure may include additional signaling fields following the major and minor version signals. For example, the signal structure may include a wake up bit. This can be an emergency alert wake up bit, for example. This is a 1 bit field that is either on (1) or off (0).

The signal structure may further include a Minimum Time Interval to Next Frame of Same Major and Minor Version field. This is defined as the time period measured from the start of the bootstrap for frame A to the earliest possible occurrence of the start of the bootstrap for frame B. Bootstrap B is guaranteed to lie within the time window beginning at the signaled minimum time interval value ending at the next-higher minimum time interval value that could have been signaled. If the highest-possible minimum time interval value is signaled, then this time window is unterminated. An example signal mapping formulas can be defined as:

$$T = \begin{cases} T = 50 \times X + 50 & 0 \le X < 8) \\ T = 100 \times (X - 8) + 500 & 8 \le X < 16) \\ T = 200 \times (X - 16) + 1300 & 16 \le X < 24) \\ T = 400 \times (X - 24) + 2900 & 24 \le X < 32) \end{cases} \quad \text{Equ (24)}$$

Thus, an example signaled value of X=10 would indicate that bootstrap B lies somewhere in a time window that begins 700 ms from the start of bootstrap A and ends 800 ms from the start of bootstrap A.

The quantity is signaled via a sliding scale with increasing granularities as the signaled minimum time interval value increases. X represents the 5-bit value that is signaled and T represents the minimum time interval in milliseconds to the next frame that matches the same version number as the current frame. Table 2 illustrates example values.

TABLE 2

Example Minimum Time Interval To Next Frame

| Index | Bit Value | Minimum Time Interval (ms) |
| --- | --- | --- |
| 0 | 00000 | 50 |
| 1 | 00001 | 100 |
| 2 | 00010 | 150 |
| 3 | 00011 | 200 |
| 4 | 00100 | 250 |
| 5 | 00101 | 300 |
| 6 | 00110 | 350 |
| 7 | 00111 | 400 |
| 8 | 01000 | 500 |
| 9 | 01001 | 600 |
| 10 | 01010 | 700 |
| 11 | 01011 | 800 |
| 12 | 01100 | 900 |
| 13 | 01101 | 1000 |
| 14 | 01110 | 1100 |
| 15 | 01111 | 1200 |
| 16 | 10000 | 1300 |
| 17 | 10001 | 1500 |
| 18 | 10010 | 1700 |
| 19 | 10011 | 1900 |
| 20 | 10100 | 2100 |
| 21 | 10101 | 2300 |
| 22 | 10110 | 2500 |
| 23 | 10111 | 2700 |
| 24 | 11000 | 2900 |
| 25 | 11001 | 3300 |
| 26 | 11010 | 3700 |
| 27 | 11011 | 4100 |
| 28 | 11100 | 4500 |
| 29 | 11101 | 4900 |
| 30 | 11110 | 5300 |
| 31 | 11111 | 5700 |

The signal structure may further include a System Bandwidth field. This field signals the system bandwidth used for the post-bootstrap portion of the current frame. Values include 00=6 MHz, 01=7 MHz, 10=8 MHz, 11=Greater than 8 MHz. It should be appreciated that the "greater than 8 MHz" option facilitates future operation using a system bandwidth greater than 8 MHz. Receivers that are not provisioned to handle a system bandwidth greater than 8 MHz could ignore frames where this field is equal to 11.

Table 3 illustrates bootstrap signaling fields are mapped to specific signaling bits and bootstrap symbols, in one example. The most significant to least significant bits of each signaling field are mapped to the specified signaling bits in the given order from left to right. It should be appreciated that $b_i^n$ refers to the ith signaling bit of the nth bootstrap symbol, and that bootstrap symbol 0 does not carry any specific signaling bits.

TABLE 3

Example Bootstrap Signaling Bit Mappings

| Field Name | # Bits | Signaling Bit Mapping (MSB to LSB) |
|---|---|---|
| Major System Version Number | 0 | n/a |
| Minor System Version Number | 0 | n/a |
| Minimum Time Interval to Next Frame of Same Major and Minor Version | 5 | $b_3^1 \, b_4^1 \, b_5^1 \, b_6^1 \, b_7^1$ |
| EAS Wake Up | 1 | $b_0^1$ |
| System Bandwidth | 2 | $b_1^1 \, b_2^1$ |
| BSR_COEFFICIENT | 7 | $b_0^2 \, b_1^2 \, b_2^2 \, b_3^2 \, b_4^2 \, b_5^2 \, b_6^2$ |
| Preamble Structure Indicator | 6 | $b_0^3 \, b_1^3 \, b_2^3 \, b_3^3 \, b_4^3 \, b_5^3$ |
| Number of LDM layers | 1 | $b_6^3$ |

Figure 11:
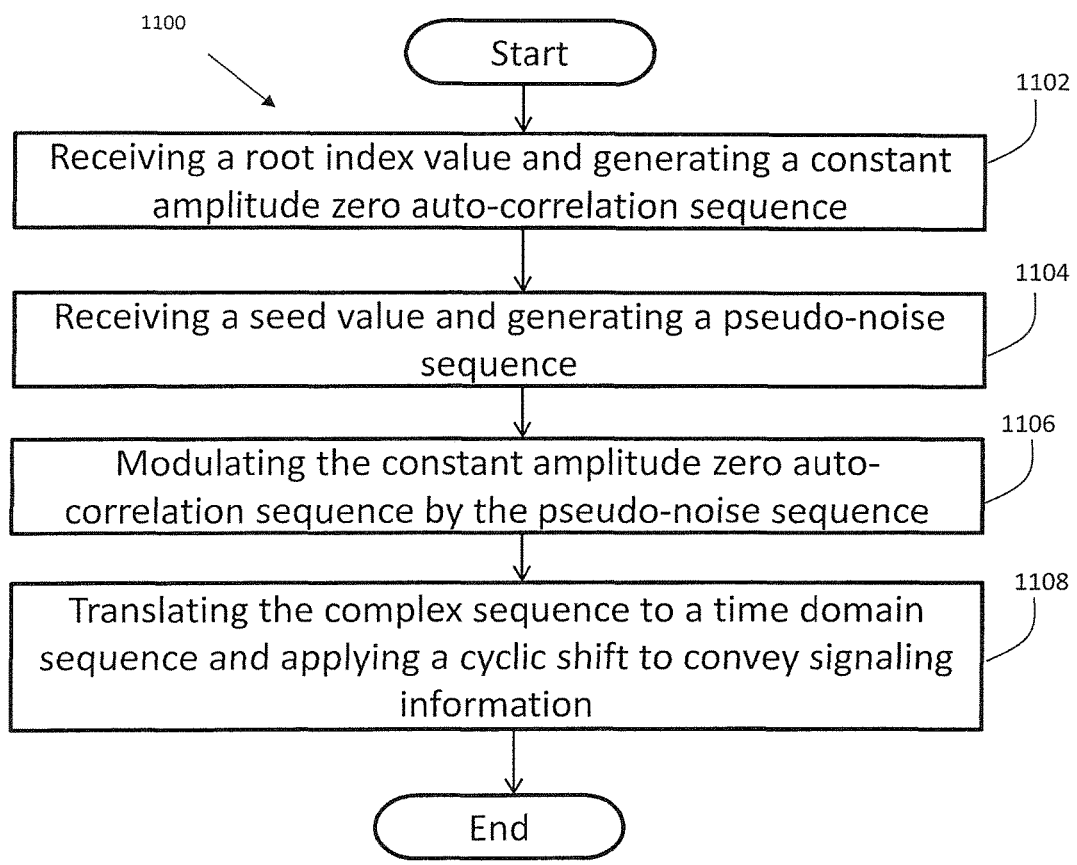
FIG. 11 illustrates an example for originating bootstrap symbols.

FIG. 11 illustrates an example extensible communication method. At step 1102, a first module receives a root index value and generates a constant amplitude zero auto-correlation sequence based on the root value. At step 1104 a second module receives a seed value and generates a Pseudo-Noise sequence based on the seed value. At step 1106 a third module modulates the constant amplitude zero auto-correlation sequence by the Pseudo-Noise sequence and generates a complex sequence. At step 1108 a fourth module translates the complex sequence to a time domain sequence and applies a cyclic shift to the time domain sequence to obtain a shifted time domain sequence.

Figure 12:
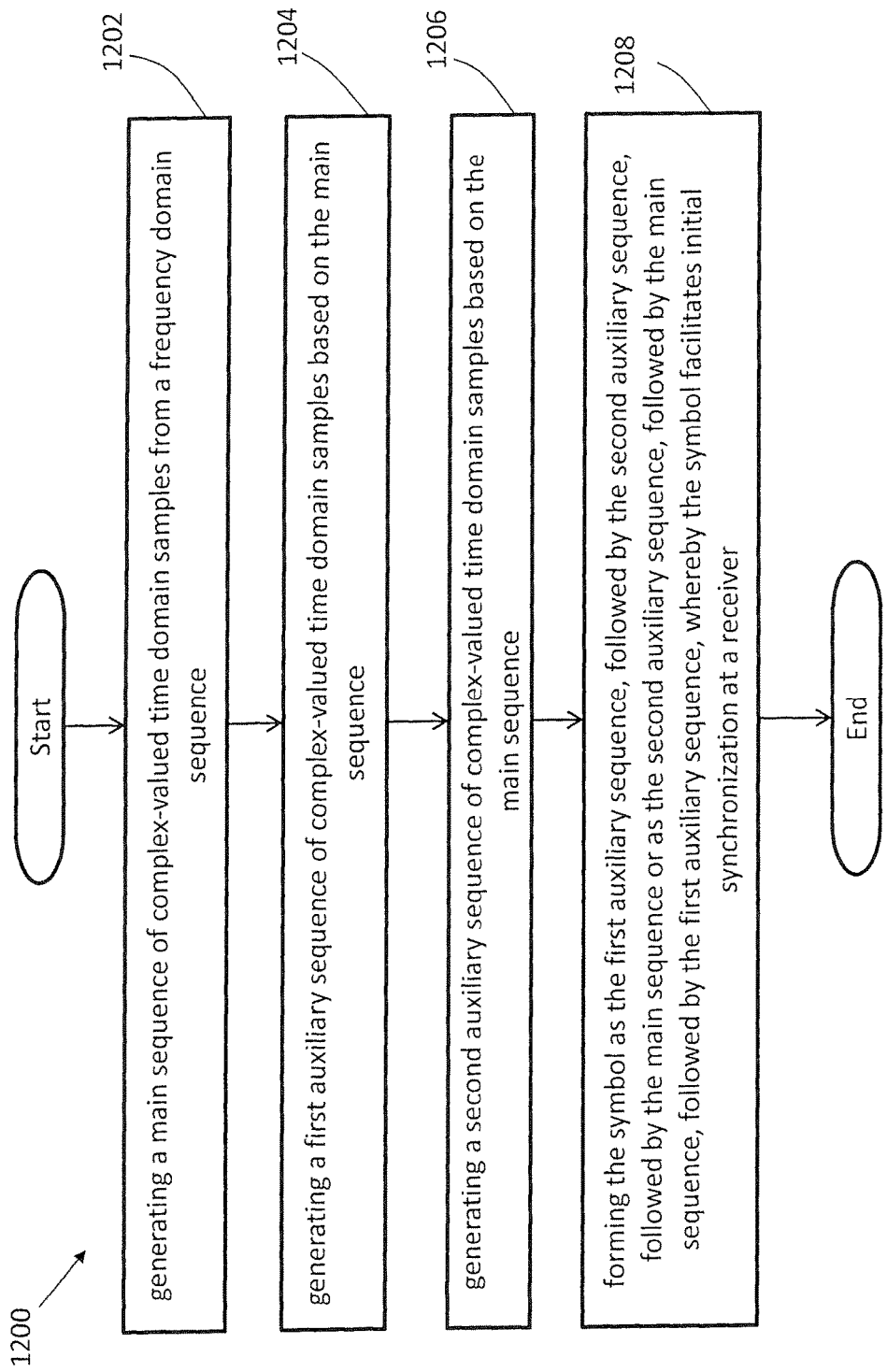
FIG. 12 is a flowchart for a method for generating a symbol in a plurality of symbols, according to some embodiments.

FIG. 12 is a flowchart for a method for generating a symbol in a plurality of symbols, according to some embodiments. Method 1200 can be performed by processing logic that can comprise hardware (e.g., circuitry, dedicated logic, programmable logic, microcode, etc.), software (e.g., instructions executing on a processing device), or a combination thereof. At 1202, a system, such as system 200, generates a main sequence of complex-valued time domain samples from a frequency domain sequence. At step 1204, system 200 generates a first auxiliary sequence of complex-valued time domain samples based on the main sequence. For example, the first auxiliary sequence of complex-valued time domain samples is generated based on a first portion of the main sequence. At 1206, system 200 generates a second auxiliary sequence of complex-valued time domain samples based on the main sequence. For example, the second auxiliary sequence of complex-valued time domain samples is generated based on a second portion of the main sequence, wherein the first portion of the main sequence overlaps with the second portion of the main sequence. At 1208, system 200 forms a symbol as the first auxiliary sequence, followed by the second auxiliary sequence, followed by the main sequence or as the second auxiliary sequence, followed by the main sequence, followed by the first auxiliary sequence. The symbol can facilitate initial synchronization at a receiver.

Any of the various embodiments described herein may be realized in any of various forms, e.g., as a computer-implemented method, as a computer-readable memory medium, as a computer system, etc. A system may be realized by one or more custom-designed hardware devices such as Application Specific Integrated Circuits (ASICs), by one or more programmable hardware elements such as Field Programmable Gate Arrays (FPGAs), by one or more processors executing stored program instructions, or by any combination of the foregoing.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a mobile device, a wearable computer, a sensing device, a television, a video acquisition device, a computer embedded in a living organism, etc. The computer system may include one or more display devices. Any of the various computational results disclosed herein may be displayed via a display device or otherwise presented as output via a user interface device.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modem Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicants general inventive concept.

What is claimed is:

1. A method for generating a symbol in a plurality of symbols, the method comprising:
   generating a main sequence of complex-valued time domain samples from a frequency domain sequence;
   generating a first auxiliary sequence of complex-valued time domain samples based on the main sequence, wherein the first auxiliary sequence comprises a first plurality of samples of the main sequence;

generating a second auxiliary sequence of complex-valued time domain samples based on the main sequence, wherein the second auxiliary sequence comprises a second plurality of samples of the main sequence and wherein the first plurality of samples overlap with the second plurality of samples;
forming the symbol as the first auxiliary sequence, followed by the second auxiliary sequence, followed by the main sequence; and
transmitting the symbol to one or more receiver devices, wherein the symbol facilitates initial synchronization at the one or more receiver devices.

2. The method of claim 1, wherein generating the first auxiliary sequence comprises:
selecting 504 samples before the last 16 samples of the main sequence as the first plurality of samples; and
multiplying the selected samples by a complex number to generate the first auxiliary sequence.

3. The method of claim 1, wherein generating the second auxiliary sequence comprises:
selecting the last 520 samples of the main sequence as the second plurality of samples.

4. The method of claim 1, wherein generating the main sequence comprises:
applying a cyclic shift to a time domain sequence that is derived from the frequency domain sequence.

5. The method of claim 4, wherein the cyclic shift comprises a relative cyclic shift between the symbol and a previous symbol and an absolute cyclic shift of the previous symbol.

6. The method of claim 5, wherein applying the cyclic shift comprises:
adding the relative cyclic shift and the absolute cyclic shift before applying the cyclic shift.

7. The method of claim 1, wherein the plurality of symbols have a fixed sampling rate and a fixed bandwidth.

8. The method of claim 7, wherein the fixed sampling rate is 6.144 Msamples/second and the fixed bandwidth is 4.5 MHz.

9. A transmitter for generating a symbol in a plurality of symbols, the transmitter comprising:
a memory that stores instructions; and
a processor, upon executing the instructions, configured to:
generate a main sequence of complex-valued time domain samples from a frequency domain sequence;
generate a first auxiliary sequence of complex-valued time domain samples based on the main sequence, wherein the first auxiliary sequence comprises a first plurality of samples of the main sequence;
generate a second auxiliary sequence of complex-valued time domain samples based on the main sequence, wherein the second auxiliary sequence comprises a second plurality of samples of the main sequence and wherein the first plurality of samples overlap with the second plurality of samples;
form the symbol as the first auxiliary sequence, followed by the second auxiliary sequence, followed by the main sequence; and
transmit the symbol to one or more receiver devices, wherein the symbol facilitates initial synchronization at the one or more receiver devices.

10. The transmitter of claim 9, wherein to generate the first auxiliary sequence, the processor is further configured to:
select 504 samples before the last 16 samples of the main sequence as the first plurality of samples; and
multiply the selected samples by a complex number to generate the first auxiliary sequence.

11. The transmitter of claim 9, wherein to generate the second auxiliary sequence, the processor is further configured to select the last 520 samples of the main sequence as the second plurality of samples.

12. The transmitter of claim 9, wherein to generate the main sequence, the processor is further configured to apply a cyclic shift to a time domain sequence that is derived from the frequency domain sequence.

13. The transmitter of claim 12, wherein the cyclic shift comprises a relative cyclic shift between the symbol and a previous symbol and an absolute cyclic shift of the previous symbol.

14. The transmitter of claim 13, wherein the processor is further configured to add the relative cyclic shift and the absolute cyclic shift before applying the cyclic shift.

15. The transmitter of claim 9, wherein the plurality of symbols have a fixed sampling rate and a fixed bandwidth.

16. The transmitter of claim 15, wherein the fixed sampling rate is 6.144 Msamples/second and the fixed bandwidth is 4.5 MHz.

17. A system, comprising:
a transmitter for generating a symbol in a plurality of symbols, the transmitter comprising:
a memory that stores instructions; and
a processor, upon executing the instructions, configured to:
generate a main sequence of complex-valued time domain samples from a frequency domain sequence;
generate a first auxiliary sequence of complex-valued time domain samples based on the main sequence, wherein the first auxiliary sequence comprises a first plurality of samples of the main sequence;
generate a second auxiliary sequence of complex-valued time domain samples based on the main sequence, wherein the second auxiliary sequence comprises a second plurality of samples of the main sequence and wherein the first plurality of samples overlap with the second plurality of samples;
form the symbol as the first auxiliary sequence, followed by the second auxiliary sequence, followed by the main sequence; and
transmit the symbol to a receiver device, wherein the symbol facilitates initial synchronization at the receiver device.

18. The system of claim 17, wherein to generate the first auxiliary sequence, the processor is further configured to:
select 504 samples before the last 16 samples of the main sequence as the first plurality of samples; and
multiply the selected samples by a complex number to generate the first auxiliary sequence.

19. The system of claim 17, wherein to generate the second auxiliary sequence, the processor is further configured to select the last 520 samples of the main sequence as the second plurality of samples.

20. The system of claim 17, wherein to generate the main sequence, the processor is further configured to apply a cyclic shift to a time domain sequence that is derived from the frequency domain sequence.

21. The system of claim 20, wherein the cyclic shift comprises a relative cyclic shift between the symbol and a previous symbol and an absolute cyclic shift of the previous symbol.

22. The system of claim 21, wherein the processor is further configured to add the relative cyclic shift and the absolute cyclic shift before applying the cyclic shift.

23. The system of claim 17, wherein the plurality of symbols have a fixed sampling rate and a fixed bandwidth.

24. The system of claim 23, wherein the fixed sampling rate is 6.144 Msamples/second and the fixed bandwidth is 4.5 MHz.

25. The system of claim 17, wherein the receiver device is configured to receive a plurality of symbols comprising the transmitted symbol.

26. A method, comprising:
generating a first auxiliary sequence of complex-valued time domain samples based on a first main sequence;
generating a second auxiliary sequence of complex-valued time domain samples based on the first main sequence;
forming a first symbol as the second auxiliary sequence, followed by the first main sequence, followed by the first auxiliary sequence;
generating a third auxiliary sequence of complex-valued time domain samples based on a second main sequence, wherein the third auxiliary sequence comprises a first plurality of samples of the second main sequence;
generating a fourth auxiliary sequence of complex-valued time domain samples based on the second main sequence, wherein the fourth auxiliary sequence comprises a second plurality of samples of the second main sequence and wherein the first plurality of samples overlap with the second plurality of samples;
forming a second symbol as the third auxiliary sequence, followed by the fourth auxiliary sequence, followed by the second main sequence;
forming a plurality of symbols based on the first and second symbols; and
transmitting the plurality of symbols to a receiver device configured to discriminate the first symbol from the second symbol for an initial synchronization at the receiver device.

27. The method of claim 26, wherein generating the first auxiliary sequence comprises:
selecting the last 504 samples of the first main sequence; and
multiplying the selected samples by a complex number.

28. The method of claim 26, wherein generating the third auxiliary sequence comprises:
selecting 504 samples before the last 16 samples of the second main sequence as the first plurality of samples; and
multiplying the selected samples by a complex number to generate the first auxiliary sequence.

* * * * *